(12) United States Patent
Hisel

(10) Patent No.: US 9,278,836 B2
(45) Date of Patent: Mar. 8, 2016

(54) HAND POWERED HYDRAULIC RESCUE STRUT

(71) Applicant: Big River Companies, Inc., Lansing, IA (US)

(72) Inventor: Jay Thomas Hisel, Lansing, IA (US)

(73) Assignee: Big River Companies, Inc., Lansing, IA (US)

( * ) Notice: Subject to any disclaimer, the term of this patent is extended or adjusted under 35 U.S.C. 154(b) by 426 days.

(21) Appl. No.: 13/662,966

(22) Filed: Oct. 29, 2012

(65) Prior Publication Data

US 2013/0105658 A1    May 2, 2013

Related U.S. Application Data

(60) Provisional application No. 61/628,433, filed on Nov. 1, 2011.

(51) Int. Cl.

| | |
|---|---|
| *F16M 13/00* | (2006.01) |
| *B66F 3/25* | (2006.01) |
| *B66F 3/42* | (2006.01) |
| *A62B 5/00* | (2006.01) |
| *F15B 15/14* | (2006.01) |

(52) U.S. Cl.
CPC ... *B66F 3/25* (2013.01); *A62B 5/00* (2013.01); *B66F 3/42* (2013.01); *F15B 15/1433* (2013.01); *F15B 15/149* (2013.01); *F15B 15/1438* (2013.01)

(58) Field of Classification Search
CPC ............... B66F 3/25; B66F 3/42; A62B 5/00; F15B 15/1433; F15B 15/1438; F15B 15/149
USPC ........... 60/477, 480, 481, 581, 39.1, 313, 323
See application file for complete search history.

(56) References Cited

U.S. PATENT DOCUMENTS

| | | | | |
|---|---|---|---|---|
| 1,482,256 | A | * | 1/1924 | Prall ................................. 60/480 |
| 2,018,506 | A | * | 10/1935 | Walker ........................ 254/93 H |
| 2,364,741 | A | * | 12/1944 | Merchant ........................... 92/52 |
| 2,556,481 | A | * | 6/1951 | Nilson ............................. 60/481 |
| 3,758,074 | A | | 9/1973 | Jeffries et al. |
| 4,641,815 | A | * | 2/1987 | Yu ................................. 254/93 H |
| 4,912,848 | A | * | 4/1990 | Bidanset ......................... 30/383 |

(Continued)

FOREIGN PATENT DOCUMENTS

| | | |
|---|---|---|
| EP | 1 468787 B1 | 12/2006 |
| GB | 2465570 A | 5/2010 |
| JP | 2005-318952 | 11/2005 |

OTHER PUBLICATIONS

Operation and Maintenance Manual for Rescue Support Systems, *Paratech Incorporated*, 41 pages (Apr. 26, 2006).

*Primary Examiner* — Dwayne J White
*Assistant Examiner* — Matthew Wiblin
(74) *Attorney, Agent, or Firm* — Merchant & Gould P.C.

(57) ABSTRACT

A manual rescue tool is disclosed. In one embodiment, the rescue tool has a hydraulic pump assembly having a hydraulic manifold block and an extension tube assembly extendable by the hydraulic pump assembly. The extension tube assembly may be mounted to and supported by the manifold block. The rescue tool may further include a first end tool operably connected to a first end of the extension tube assembly and an end plate assembly rotatably mounted to the manifold block.

35 Claims, 22 Drawing Sheets

(56) References Cited

U.S. PATENT DOCUMENTS

| | | | |
|---|---|---|---|
| 5,553,825 A * | 9/1996 | Rasmussen | B60S 9/04 248/354.3 |
| 5,636,830 A | 6/1997 | Chartrand | |
| 5,685,469 A * | 11/1997 | Stapleton | 224/505 |
| 5,988,710 A * | 11/1999 | Kortschot et al. | 292/339 |
| 6,017,170 A | 1/2000 | Michalo | |
| 6,071,062 A * | 6/2000 | Warhurst | B60P 1/6445 414/347 |
| 6,158,705 A * | 12/2000 | Cudmore et al. | 248/354.1 |
| 6,378,843 B1 * | 4/2002 | Hong | 254/2 R |
| 6,776,383 B2 * | 8/2004 | Lanka | 248/352 |
| 7,240,885 B1 | 7/2007 | Sullivan | |
| 7,490,813 B1 | 2/2009 | Weddle | |
| 7,806,381 B2 | 10/2010 | Sisk Horne et al. | |
| 8,033,527 B2 | 10/2011 | Pasto | |
| 8,113,479 B1 * | 2/2012 | O'Connell | 248/351 |

* cited by examiner

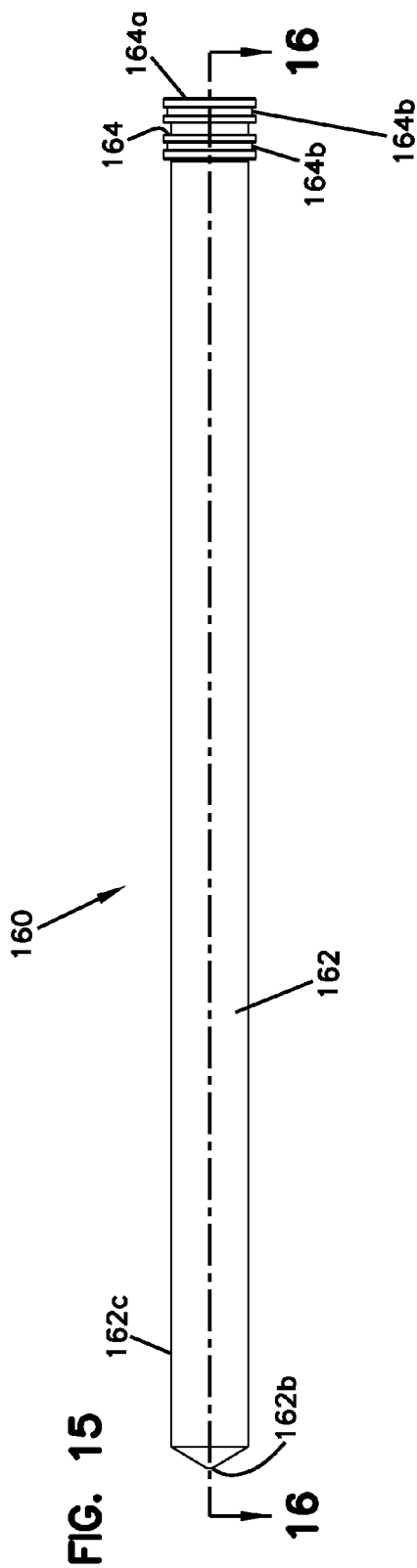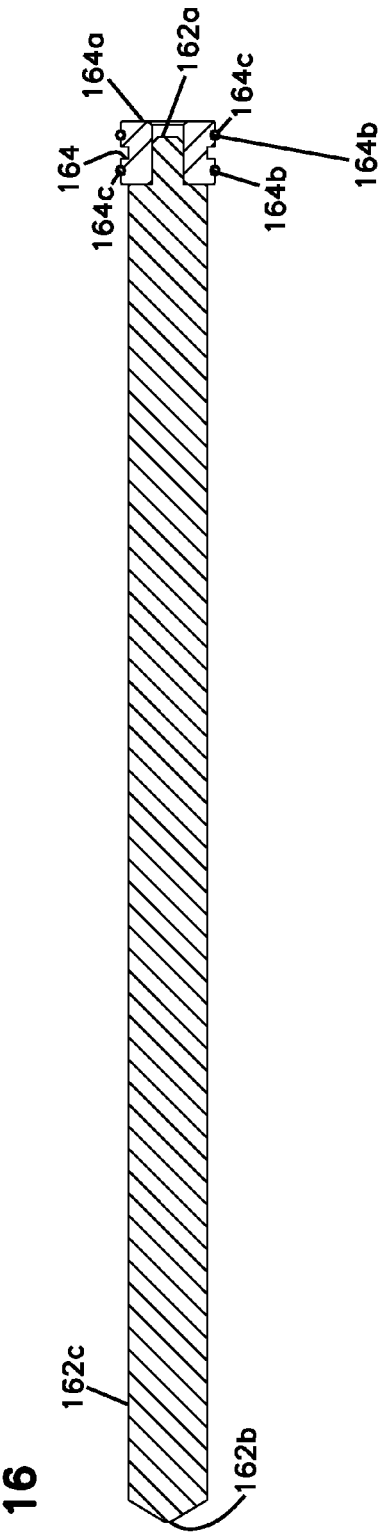

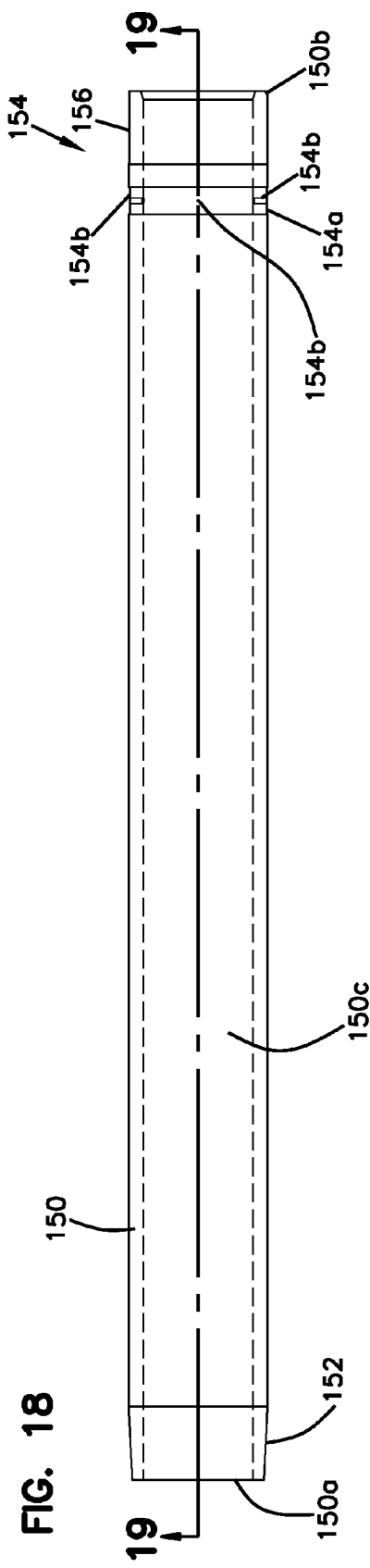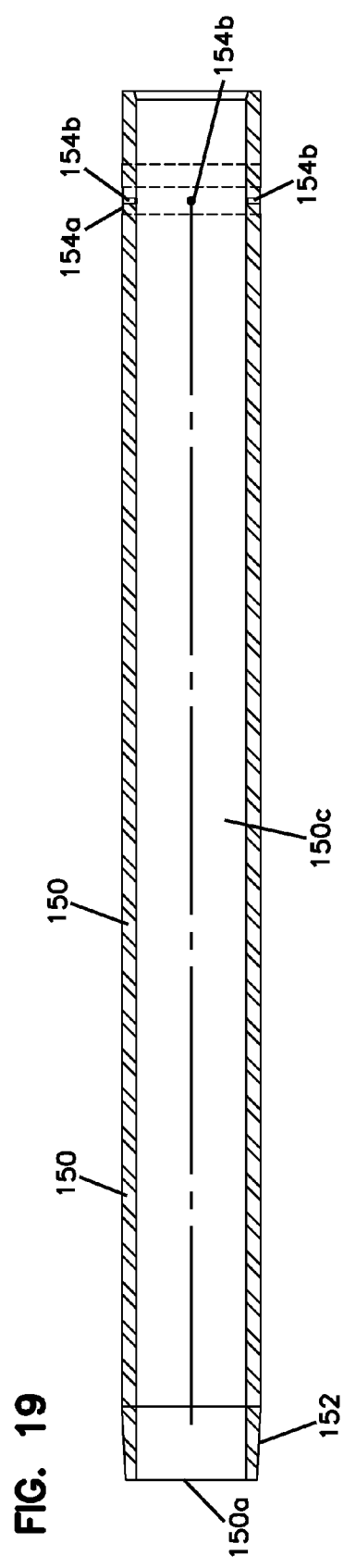

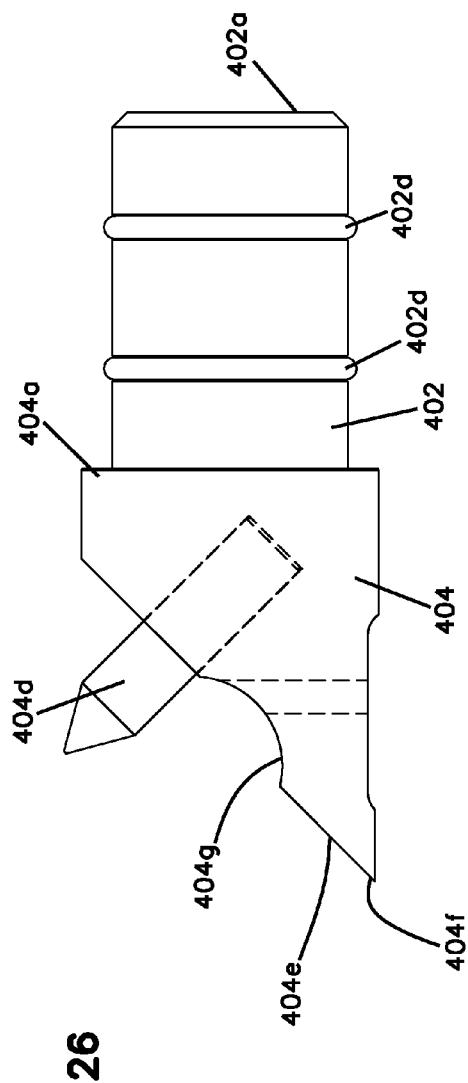
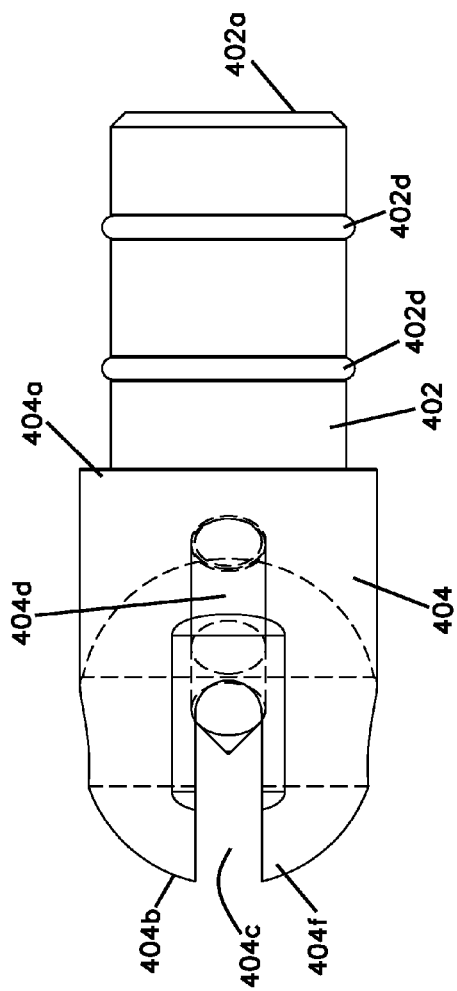
FIG. 26
FIG. 27

HAND POWERED HYDRAULIC RESCUE STRUT

CROSS-REFERENCE TO RELATED APPLICATIONS

This application claims priority to U.S. Provisional Application Ser. No. 61/628,433 to Hisel, filed on Nov. 1, 2011. U.S. Provisional Application Ser. No. 61/628,433 is hereby incorporated herein by reference in its entirety.

BACKGROUND

Extendable rescue struts or tools are commonly used to secure and stabilize an overturned vehicle that has been in an accident by creating supporting points. Some rescue tools are extendable by an external power source, such as a motorized hydraulic pump. Other rescue tools are extendable through the operation of a manual mechanical jack, such as a screw jack or a ratcheting type farm jack. However, many rescue tools having mechanical jacks require a significant period of time to assembly and/or extend to their full lengths. As rescue operations can be extremely time sensitive, improvements are desired.

SUMMARY

A manual rescue tool is disclosed. In one embodiment, the rescue tool has a hydraulic pump assembly having a hydraulic manifold block and an extension tube assembly extendable by the hydraulic pump assembly. The extension tube assembly may be mounted to and supported by the manifold block. The rescue tool may further include a first end tool operably connected to a first end of the extension tube assembly and an end plate assembly rotatably mounted to the manifold block. In one aspect, the disclosed concepts combine the speed, power, control and dependability of hydraulics with lightweight structural components, such as those made from aluminum, to provide rescue professionals with a superior tool for vehicle stabilization.

The hydraulic pump assembly of the rescue tool may have a manual hydraulic pump and wherein the hydraulic manifold block is in fluid communication with the hydraulic pump. The pump assembly may further have a cylinder tube mounted to the hydraulic manifold block wherein the cylinder tube defines an interior volume that is in fluid communication with an outlet side of the manual hydraulic pump. The pump assembly may also have an oil reservoir tube mounted to the hydraulic manifold block. In one embodiment, the oil reservoir tube and the cylinder tube define an oil reservoir in fluid communication with an inlet side of the manual hydraulic pump. The pump assembly may also have a cylinder rod having a first end and a second end wherein the first end having a piston slidable within the cylinder tube.

The extension tube assembly may be provided with an outer support tube removably mounted to the pump assembly hydraulic manifold block. The extension tube assembly may also include an inner support tube slidably received within the outer support tube and operably connected to the second end of the cylinder rod, such as by a push block. The extension tube assembly may also have an extension tube connected to the inner support tube and the first end tool wherein the extension tube being slidable within the inner support tube. The extension tube can also be adjustably connected to the inner support tube by a mounting pin.

DESCRIPTION OF THE DRAWINGS

Non-limiting and non-exhaustive embodiments are described with reference to the following figures, which are not necessarily drawn to scale, wherein like reference numerals refer to like parts throughout the various views unless otherwise specified.

FIG. 15 is a side view of the cylinder rod shown in FIG. 14.

FIG. 16 is a side cross-sectional view of the cylinder rod shown in FIG. 14, taken along line 16-16 as indicated at FIG. 15.

FIG. 18 is side view of the cylinder tube shown in FIG. 17.

FIG. 19 is a side cross-sectional view of the cylinder tube shown in FIG. 17, taken along line 19-19 as indicated at FIG. 18.

FIG. 26 is a side view of the end tool shown in FIG. 25.

FIG. 27 is a top view of the end tool shown in FIG. 25.

DETAILED DESCRIPTION

Figure 1:
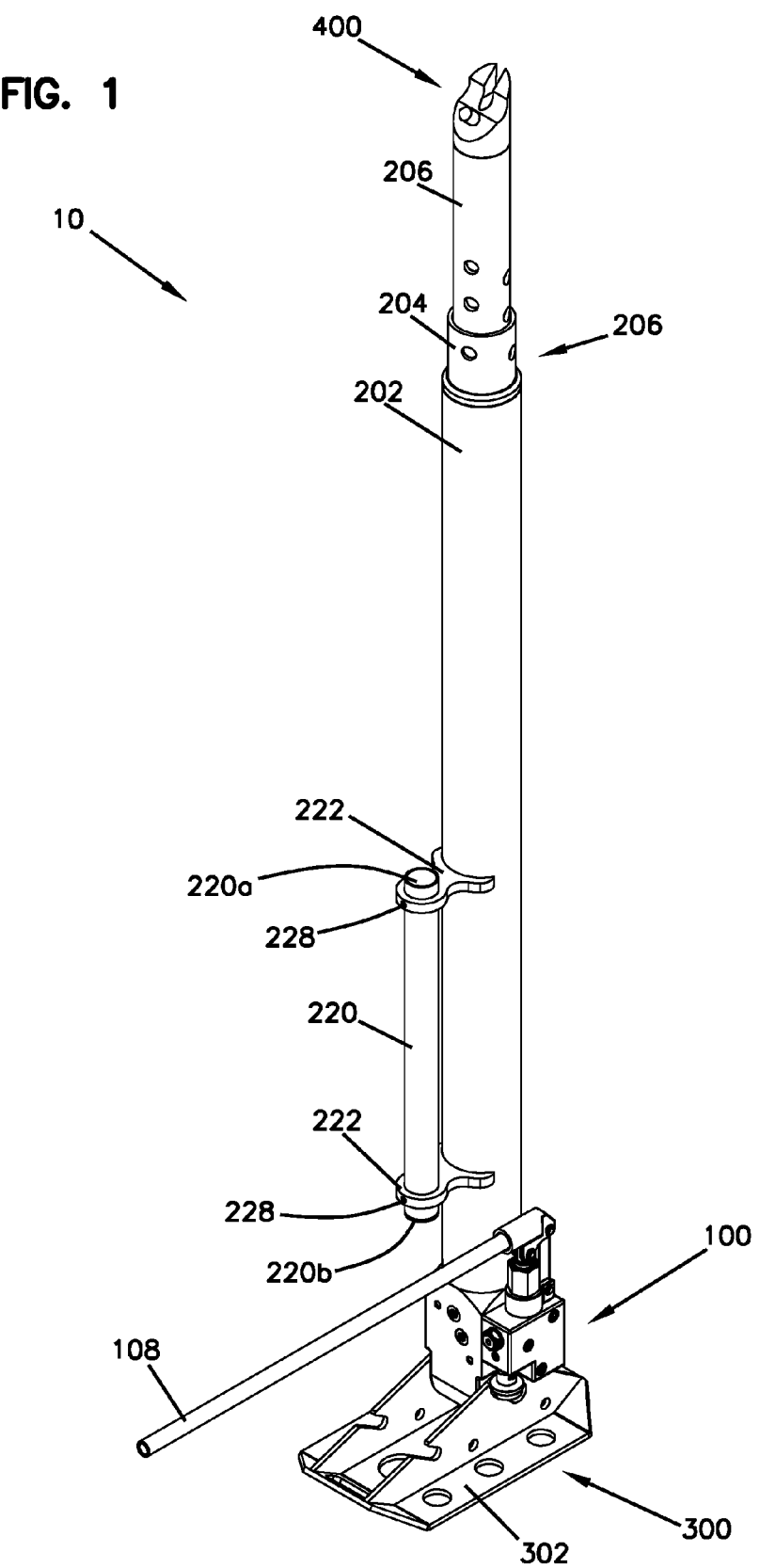
FIG. 1 is a perspective view of a hand powered hydraulic rescue strut in a retracted position having features that are examples of aspects in accordance with the principles of the present disclosure.
Figure 2:
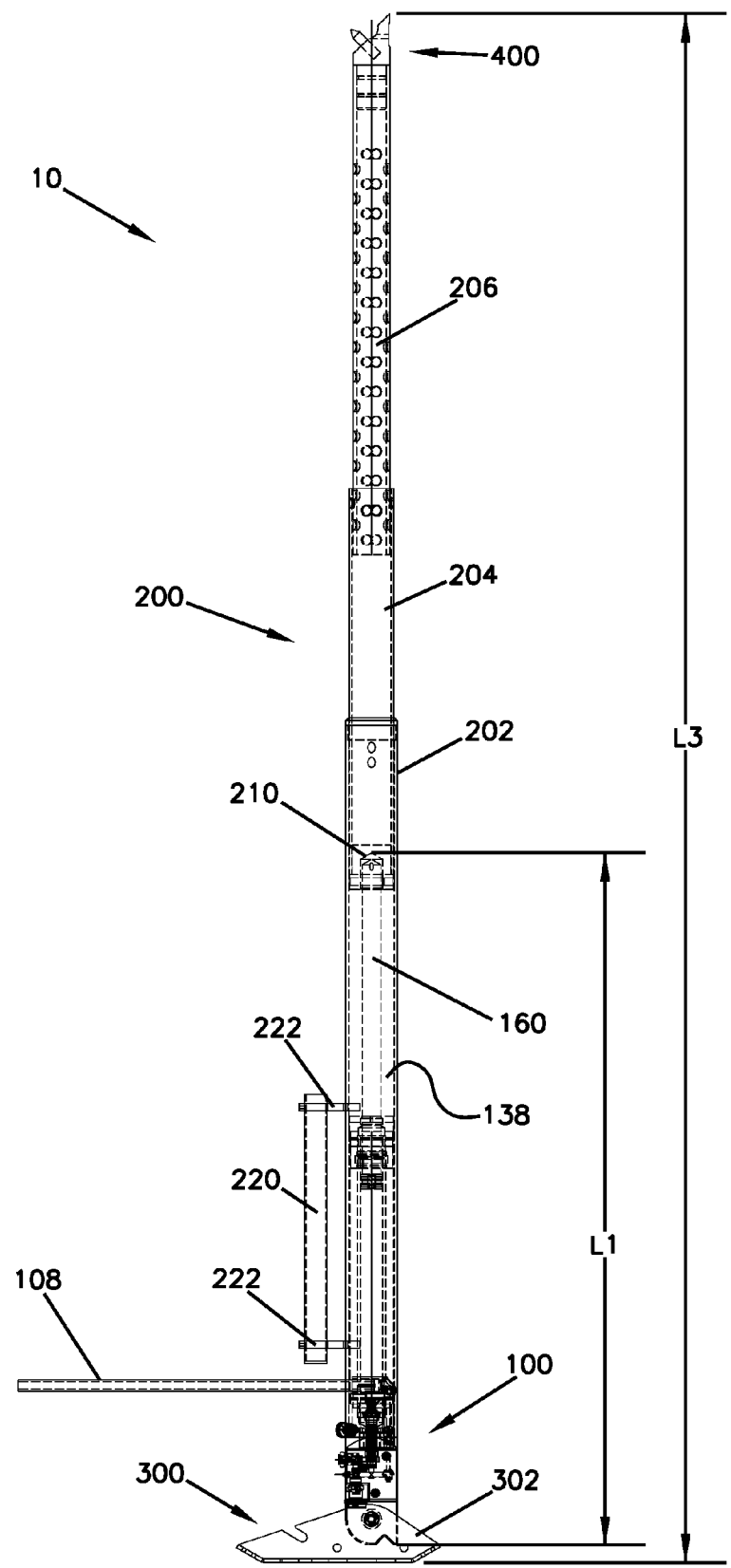
FIG. 2 is a perspective view of the rescue strut shown in FIG. 1 in an extended position.
Figure 3:
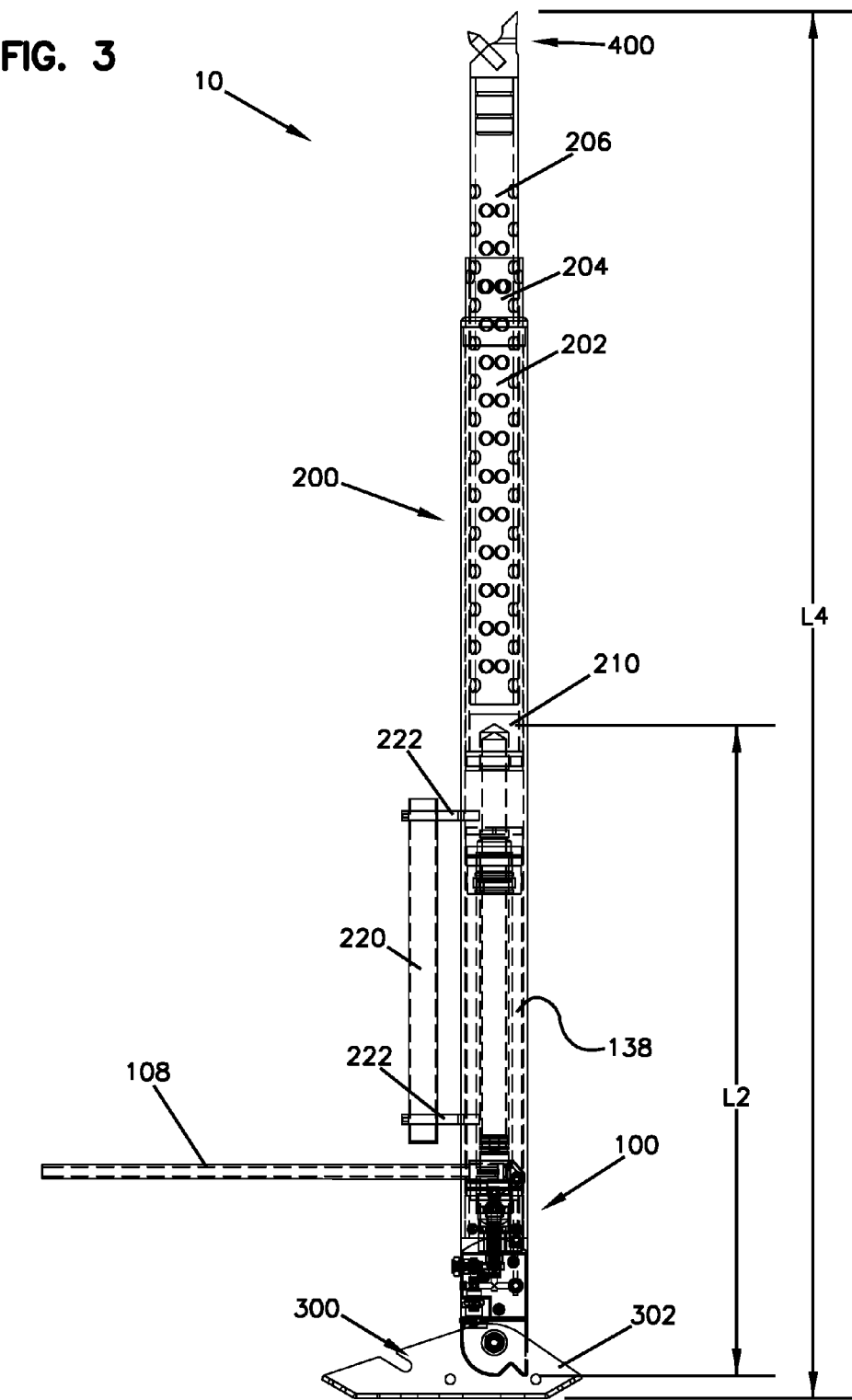
FIG. 3 is a side view of the rescue strut of FIG. 1.
Figure 4:
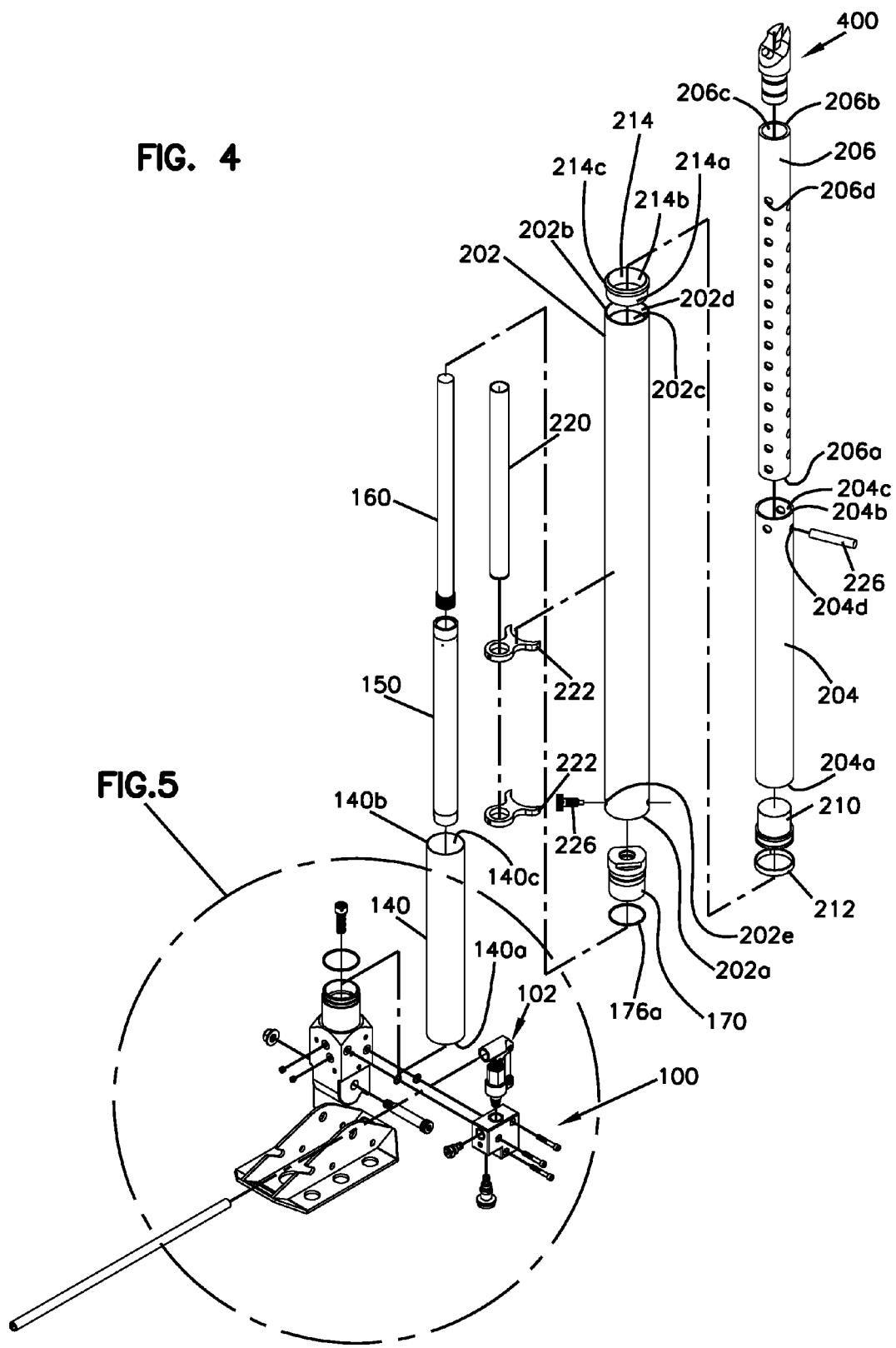
FIG. 4 is an exploded perspective view of the rescue strut of FIG. 1.
Figure 5:
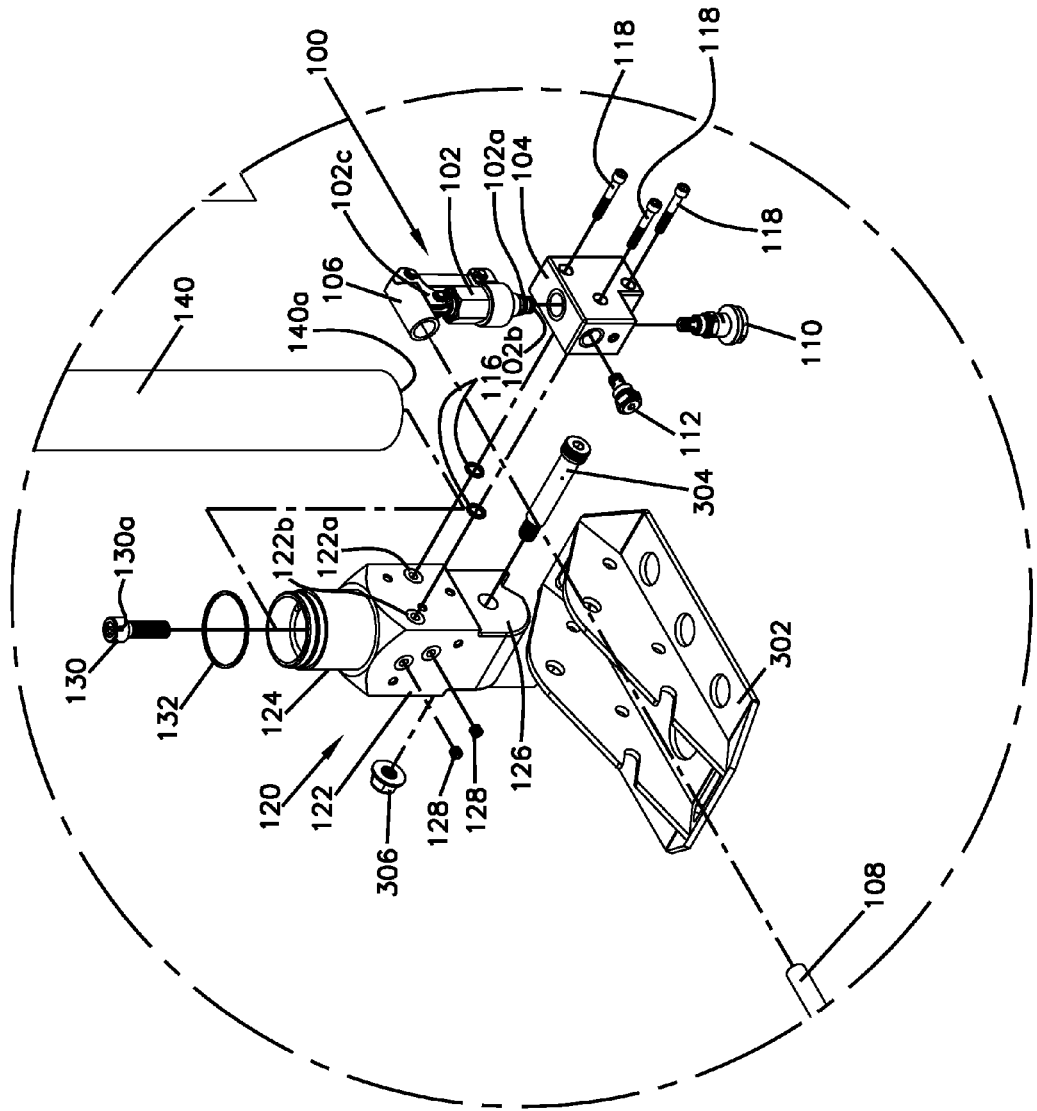
FIG. 5 is a close up exploded view of a portion of the rescue strut of FIG. 1, as indicated on FIG. 4 at location 5.
Figure 6:
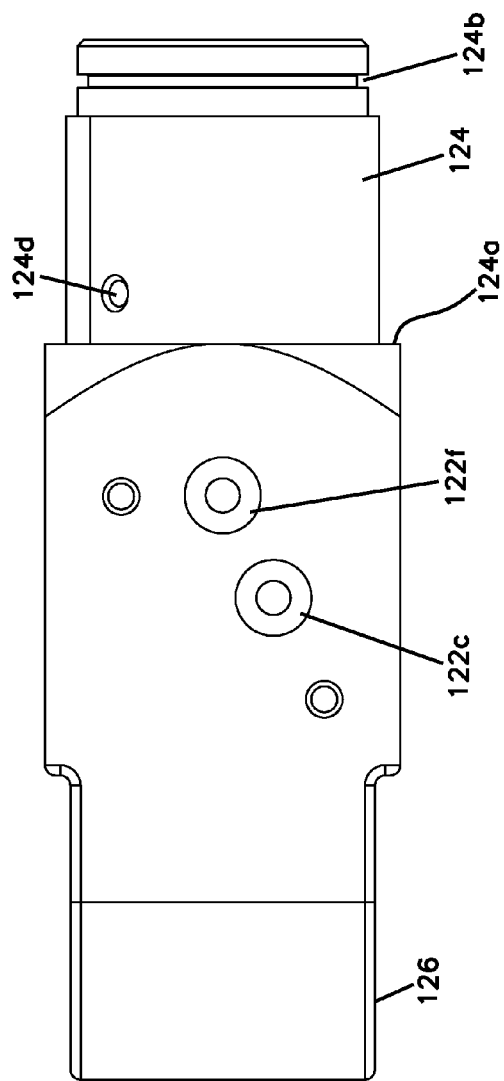
FIG. 6 is a top view of a hydraulic manifold shown as part of the rescue strut at FIG. 1.
Figure 7:
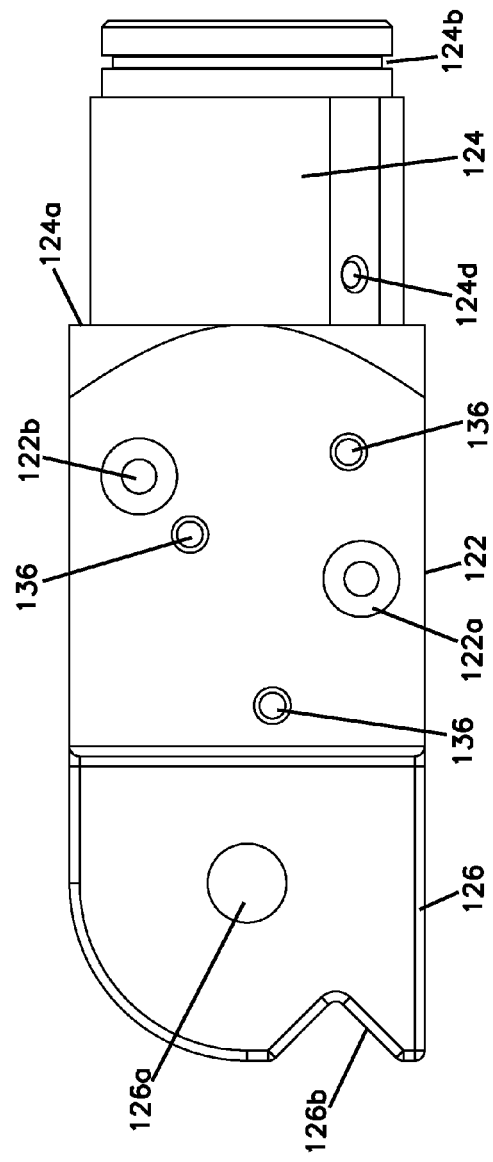
FIG. 7 is a first side view of the hydraulic manifold shown in FIG. 6.
Figure 8:
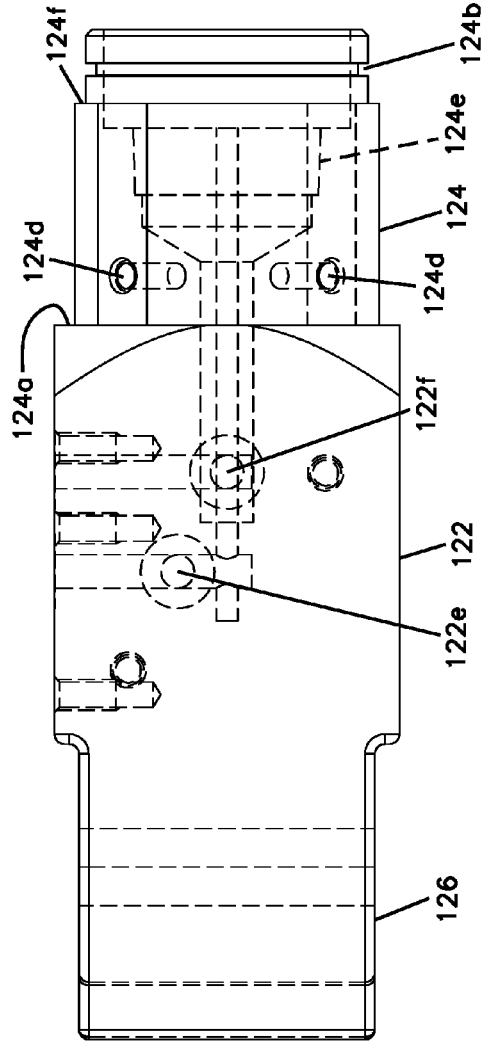
FIG. 8 is a bottom view of the hydraulic manifold shown in FIG. 6.
Figure 9:
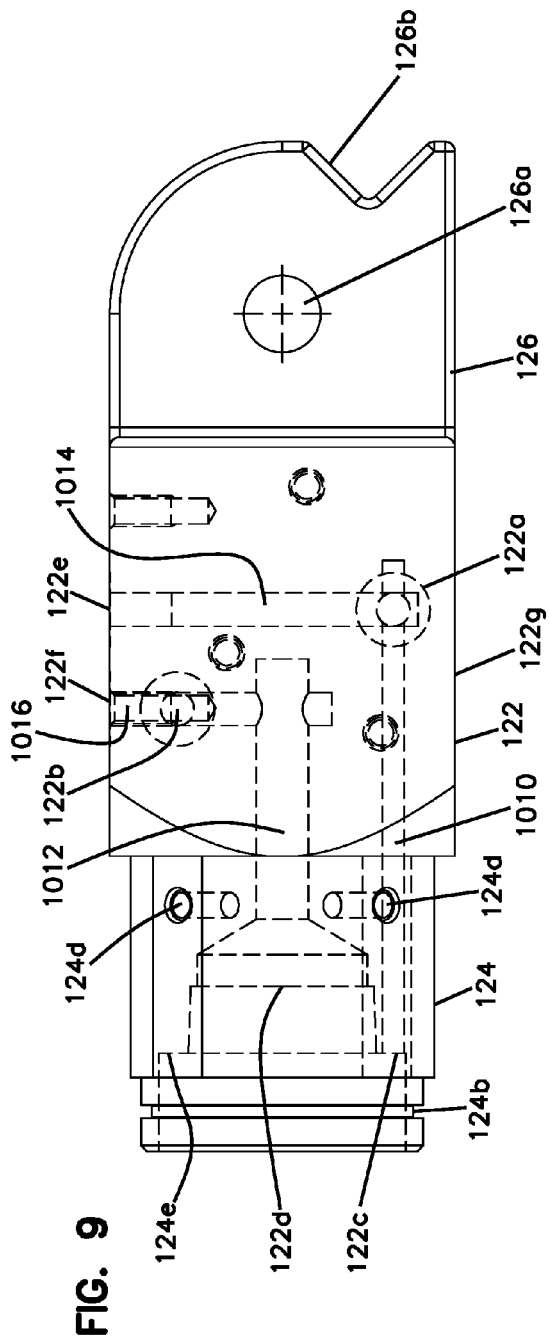
FIG. 9 is a second side view of the hydraulic manifold shown in FIG. 6.
Figure 10:
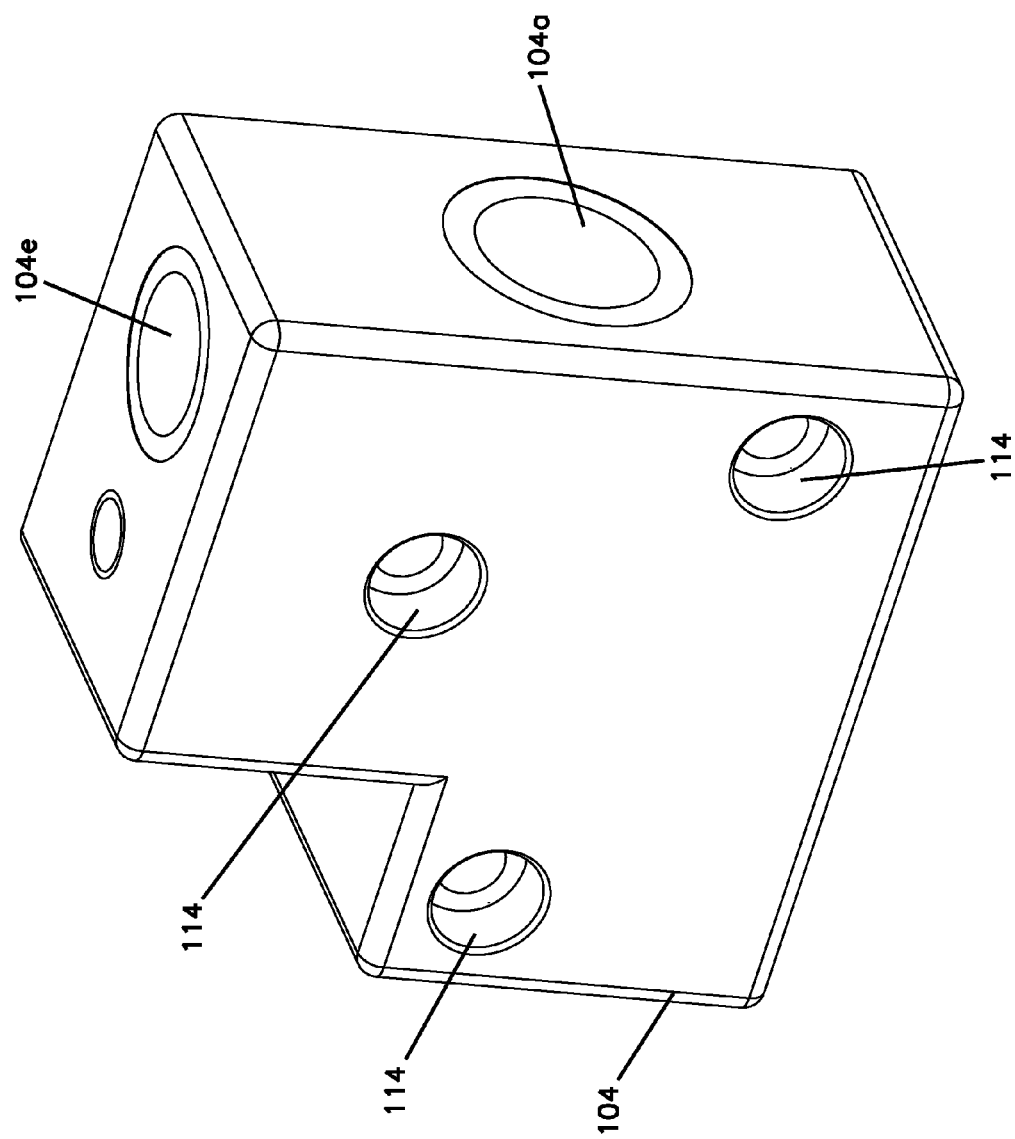
FIG. 10 is a perspective view of a pump body shown as part of the rescue strut at FIG. 1.
Figure 11:
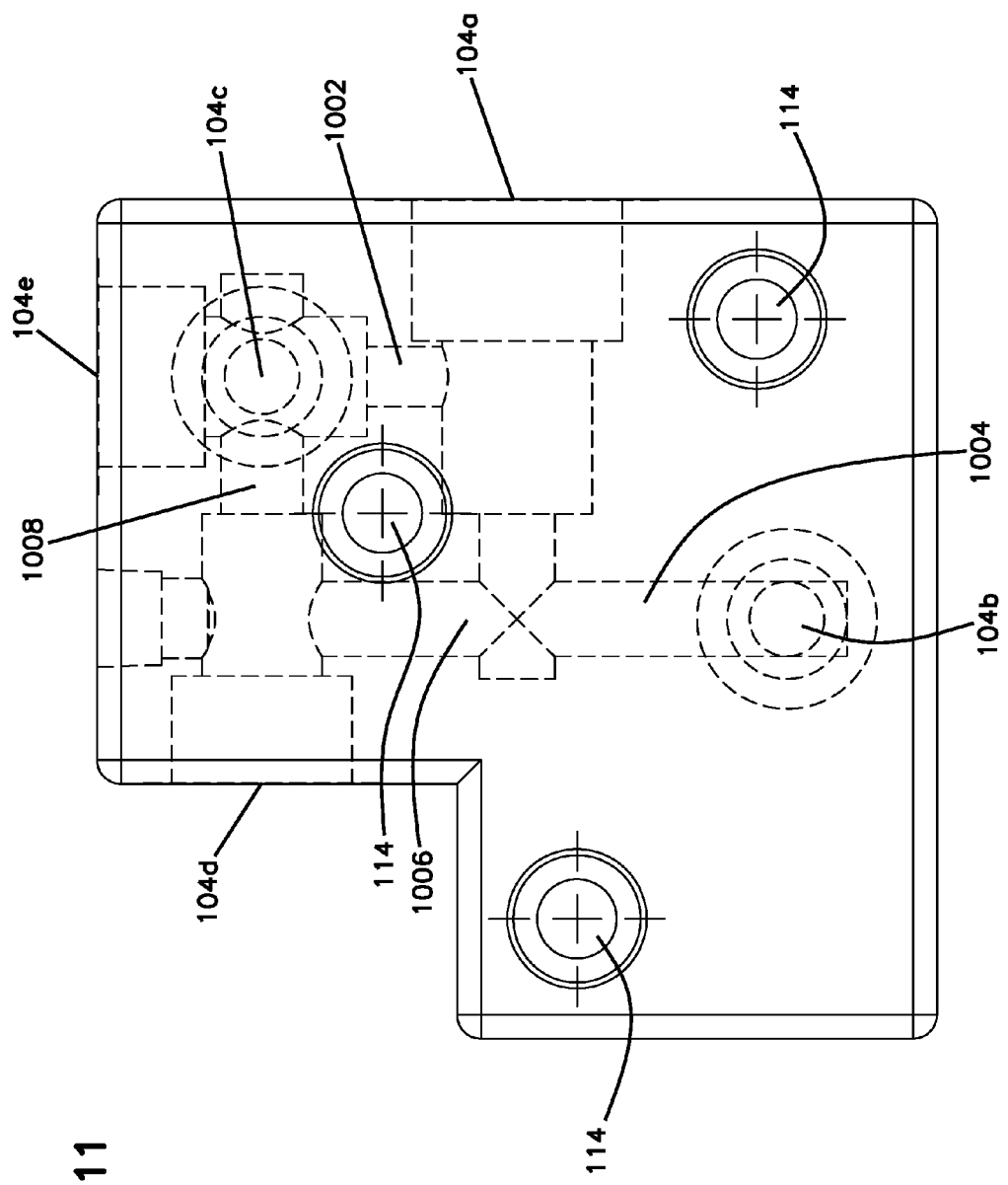
FIG. 11 is a side view of the pump body shown in FIG. 10.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Referring now to FIGS. 1-5, an example hand powered hydraulic rescue strut 10 is shown. Rescue strut 10 is for temporarily securing and stabilizing a vehicle or structure. In the embodiment shown, rescue strut 10 has a hand powered hydraulic pump assembly 100 that selectively increases or decreases the length of an extension tube assembly 200. As the extension tube assembly 200 is lengthened or shortened, the distance between a pivot plate assembly 300 and a first end tool 400 is increased or decreased, respectively.

Hydraulic Pump Assembly

As shown, hand powered hydraulic pump assembly 100 includes a hand powered pump actuator 102 in fluid communication with a hydraulic manifold 120. Pump assembly 100 is also shown as having an oil reservoir tube 140 connected to the hydraulic manifold 120 and a cylinder tube 150 positioned within the oil reservoir tube 140. As shown, an end cap 170 is connected to the cylinder tube 150 and operates, in part, to secure the oil reservoir tube 140 to the hydraulic manifold 120. The pump assembly 100 also includes a cylinder rod 160 that is movable within the cylinder tube 150. One end of the cylinder rod 160 has a piston 164 while the other end is configured to engage a push block 210 attached to the extension tube assembly 200 such that the extension tube assembly 200 is extended when hydraulic fluid is exerted on the piston 164. Additional details of the pump assembly are explained in the following paragraphs.

The pump assembly 100 is shown as having a pump actuator assembly 102 that is received in a pump body 104. The pump body defines a number of hydraulic ports 104a-104e and internal passageways 1002-1008. As shown, the pump actuator assembly 102 has a manual actuator 102c, an outlet port 102a, and an inlet port 102b. The manual actuator 102c may be operated by a handle 108 received in a handle socket 106 that is connected to the manual actuator 102c. Upon actuation of the manual actuator 102c, hydraulic fluid is forced from the inlet port 102b to the outlet port 102a. To prevent hydraulic fluid from flowing backwards from the outlet port 102a to the inlet port 102b, an internal check valve (not shown) may be provided in the pump actuator 102.

As stated above, the pump body 104 includes a number of ports and passageways that allow for the pump actuator assembly 102 to provide pressurized hydraulic fluid to the hydraulic manifold 120. For example, the pump body has a pump port 104a, an inlet port 104b, and an outlet port 104c. The pump actuator 102 is received at the pump port 104a such that the outlet port 104c is in fluid communication with the actuator outlet 102a via a fluid passageway 1002 and such that the inlet port 104b is in fluid communication with the actuator inlet 102b via a fluid passageway 1004.

The pump assembly 100 may also be provided with a relief valve 110. As shown, the relief valve 110 is received in the pump body 104 at a port 104d. As configured, the relief valve 110 operates, when opened, to provide a flow path via flow paths 1004, 1006, 1008 in pump body 104 around the pump actuator 102c so that hydraulic fluid can flow backwards from the outlet port 104c to the inlet port 104b. Accordingly, the relief valve 110, when opened, allows the pump assembly 100, and thereby the extension tube assembly 200, to contract back to its shortest possible length. When the relief valve 110 is closed, hydraulic fluid is not allowed to bypass the actuator 102c (and its internal check valve) via flow paths 1006 and 1008.

The pump assembly 100 may also be provided with a check valve 112. Where pump actuator 102 is provided with an internal check valve, valve 112 may provide a redundancy function. As configured, check valve 112 is received in a port 104e of the pump body 104 and allows fluid to flow in a direction from port 104a to port 104c, but prevents fluid flow in a direction from port 104c towards 104a via passageway 1002.

The pump assembly 100 may also be provided with a number of mounting holes 114 for mounting the pump body 104 to a hydraulic manifold block 122 of the hydraulic manifold 120. Although three mounting holes 114 are shown, more or fewer may be provided, or another form of suitable attachment known in the art may be provided. As configured, the mounting holes 114 align with corresponding mounting holes 136 on the manifold block 122. The mounting holes 136 may be threaded to receive fasteners 118, which are shown as machine screws.

It is also noted that inlet port 104b and outlet port 104c are provided with a recess such that each port 104b, 104c, can receive a seal member 116. As shown, seal members 116 are O-ring type seals. The seal members 116 are also received in corresponding recesses in the manifold block 122 at a first port 122a and second port 122b such that a fluid-tight seal is formed between ports 104b and 122a and between 104c and 122b.

As shown, the hydraulic manifold 120 has a manifold block 122 having a first end portion 124 and a second end portion 126. The hydraulic manifold 120 distributes hydraulic fluid between the pump actuator 102 and the piston 164 on the cylinder rod 162, and also directs hydraulic fluid between the pump actuator 102 and a hydraulic fluid reservoir 138. The hydraulic fluid reservoir 138 is defined by an end face 124a of the manifold block, a space defined between the oil reservoir tube 140 and the cylinder tube 150, and the end cap 170. Manifold block 122 also serves as a structural component of the rescue strut 10. In the embodiment shown, manifold block 122 is machined from an aluminum block. However, other materials and manufacturing processes may be used.

As shown, manifold block 122 has a first port 122a in fluid communication with the inlet port 104b of the pump actuator 102 and has a second port 122b in fluid communication with the outlet port 104c. The first port 122a provides for fluid communication between the inlet port 104b on the pump body 104 and the oil reservoir 138. This fluid communication is provided by a passageway 1010 and an opening 122c in the end face 124e of the manifold block 122. It is noted that opening 122c is located at the bottom-most portion of the oil reservoir 138 and therefore allows fluid from the oil reservoir 138 to be provided to the pump actuator 102 through a wide range of orientations of the manifold block 122. For example, the bottom 122g of the manifold block 122 could be rotated anywhere between horizontal with the ground (zero degrees) to about 120 degrees while still allowing for the pump actuator 102 to remain operable. As such, the hydraulic pump assembly 100 is operable when the rescue strut 10 is in either a horizontal or a vertical position, and positions there between.

The second port 122b provides for fluid communication between the outlet port 104c on the pump body 104 and the interior volume 150c of the cylinder tube 150 via a passageway 1012 and an outlet opening 122d. The manifold block includes additional ports 122e, 122f in fluid communication with ports 122a, 122b via passageways 1014, 1016, respectively. Ports 122e, 122f allow for the manifold block 122 to be connected to and operated by an external pressure source, such as another manual pump or a compressed air powered pump. Plugs 128 may be provided to block ports 122e, 122f when not in use.

The manifold block 122, at the first end portion 124, is configured to receive both the oil reservoir tube 140 and the cylinder tube 150. As shown, the cylinder tube 150 is threaded onto a threaded portion 124c of the manifold block 122 via threads 152 at a first end 150a of the cylinder tube 150. As shown, threads 152 and 124c are tapered NPT threads. The configuration of the cylinder tube 150 allows the interior volume 150c of the cylinder tube 150 to be placed in fluid communication with the opening 122d of the manifold block 122 such that hydraulic fluid can enter the cylinder tube 150.

The oil reservoir tube 140 is placed over the cylinder tube 150 such that a first end 140a of the oil reservoir tube 140 abuts a shoulder 124f on the manifold block 122. A seal is formed between the manifold block first end 124 and the oil reservoir tube 140 via a seal member 132 retained in a groove 124b. As shown, seal member 132 is an O-ring seal. The oil reservoir tube 140 is secured to the manifold block 122 by the end cap 170 which threads onto threads 156 at a second end 150b of the cylinder tube 150 and exerts a compressive force against a second end 140b of the oil reservoir tube 140 with a shoulder 180. A seal is formed between the end cap 170 and the oil reservoir tube by a seal member 176a located in a groove 176 of the end cap. As shown, the seal member 176a is an O-ring type seal. With the end cap 170 in place, the oil reservoir 138 is formed within the interior volume 140c of the oil reservoir tube and outside of the cylinder tube 150 and between the end cap 170 and the manifold block 122. As stated previously, the oil reservoir 138 formed by the oil reservoir tube 140 and cylinder tube 150 is in fluid communication with opening 122c to allow for fluid flow between the pump actuator 102 and the oil reservoir 138.

The first end portion 124 of the hydraulic manifold 120 is also provided with a threaded portion 122h at the end of passageway 1012 for receiving a bottom out screw 130. Bottom out screw 130 is provided with porting 130a such that hydraulic fluid can freely pass from passageway 1012 and into opening 122d. The bottom out screw 130 functions to prevent the piston 164 of the cylinder rod assembly 160 from bottoming out in the opening 122d which could cause excessive forces that would damage the manifold block 122.

The first end portion 124 of the hydraulic manifold 120 is also shown as having a shoulder 124a for abutting a first end 202a of an outer support tube 202 of the extension tube assembly. The outer support tube 202 may be secured to the first end portion 124 by a connector 226, such as a quick release fastener, that passes through a mounting hole 202e of the outer support tube 202 and a mounting hole 124d of the hydraulic manifold 122.

The second end portion 126 of the hydraulic manifold 120 is configured for attachment to the end plate assembly 300. As shown, the second end portion 126 is provided with a through hole 126a for receiving a mounting pin 304 that is also received by the end plate assembly 300 (discussed later). As shown, the mounting pin 304 is secured with a nut 306. A clevis or hitch pin with a tethered or untethered retaining pin can also be used to aid in quick disassembly. The through hole 126a and mounting pin 304 allow for the pump assembly 100 to be rotatably mounted with respect to the end plate assembly 300. The second end portion 126 is also provided with a recessed portion 126b that allows for the pump assembly 100 to engage with a surface when the end plate assembly 300 is not installed. For example, the pump assembly 100 could be positioned generally horizontally in a dash-roll type operation wherein the recessed anchor portion 126 is engaged with a frame portion of a vehicle doorway or a rocker panel support channel that is designed for engagement with the anchor portion 126 and a portion of a vehicle or other structure.

As shown, the piston 114 is disposed within the cylinder tube 150. As pump actuator 102 is operated to force hydraulic fluid into the cylinder tube 150, the piston 114 is driven away from the manifold 106 and towards the extension tube assembly 200. Conversely, when oil is drained from the cylinder tube 150, the piston 114 falls towards the manifold 106. As the cylinder rod 116 is connected to piston 114, the cylinder rod 116 likewise follows the motion of the piston 114.

With reference to FIGS. 17-20, the cylinder tube 150 is shown in greater detail. In addition to the above described features, the cylinder tube 150 can also be provided with a fluid bypass feature 154 to protect the pump assembly 100 from over pressurization. The fluid bypass feature allows for hydraulic fluid to be passed from the interior volume 150c of the cylinder tube into the oil reservoir when the piston 164 moves beyond the bypass feature 154 within the cylinder tube 150. When the piston 164 reaches this point, hydraulic fluid can no longer force the piston 164 further along in the cylinder tube 150 to extend the length of the extension tube assembly 200. As shown, the bypass feature 154 is defined by an external groove 154a in the cylinder tube 150, a plurality of openings 154b extending through the cylinder tube sidewall at the location of the groove 154a, and an expandable shaft ring seal 154c mounted within the groove 154a. The ring seal 154c is configured such that the openings 154b are covered and sealed when the fluid pressure in the cylinder tube 150 is either negative or below a predefined level. Accordingly, the bypass feature 154 does not allow fluid to flow in the direction from the oil reservoir 138 into the cylinder tube 150 as negative fluid pressure would only act to close the ring seal 154c further. As the fluid pressure in the cylinder tube 150 increases beyond the predefined level, which is generally only a nominal pressure, the ring seal 154c is forced to expand. Once the ring seal 154c is in an expanded state, hydraulic fluid can then flow from the inside of the cylinder tube 150 and into the reservoir 138 via openings 154b.

Figure 12:
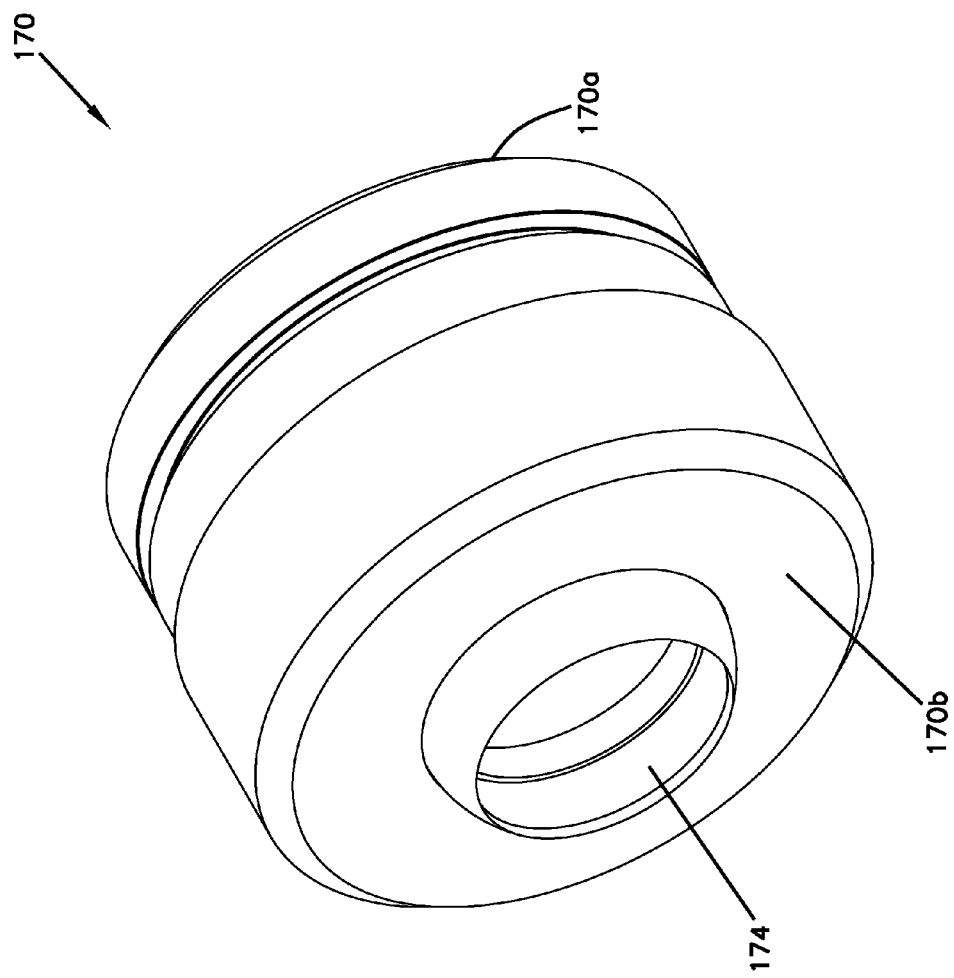
FIG. 12 is a perspective view of an end cap shown as part of the rescue strut at FIG. 4.
Figure 13:
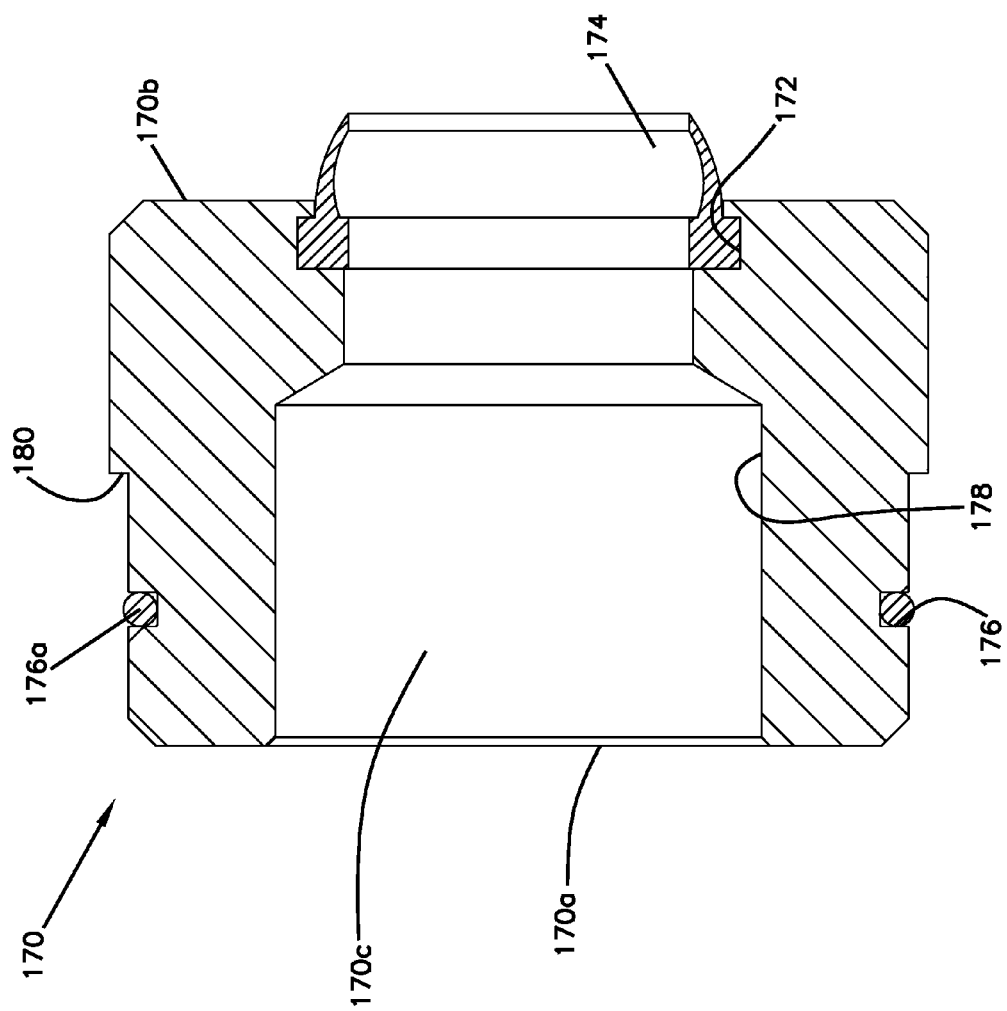
FIG. 13 is a side cross-sectional view of the end cap shown in FIG. 12.

With reference to FIGS. 12 and 13, the end cap 170 is shown in greater detail. The end cap 170 has a first end 170a and a second end 170b, defines an internal volume 170c and an internal surface 178. End cap 170 may also be provided with a recess 172 configured to accept and retain a shaft wiper 174. Shaft wiper 174 is configured to tightly surround the cylinder rod 160 and to clear any debris that may be present on cylinder rod 160 as the rod 160 is retracted through the end cap 170 and into the cylinder tube 150.

Figure 14:
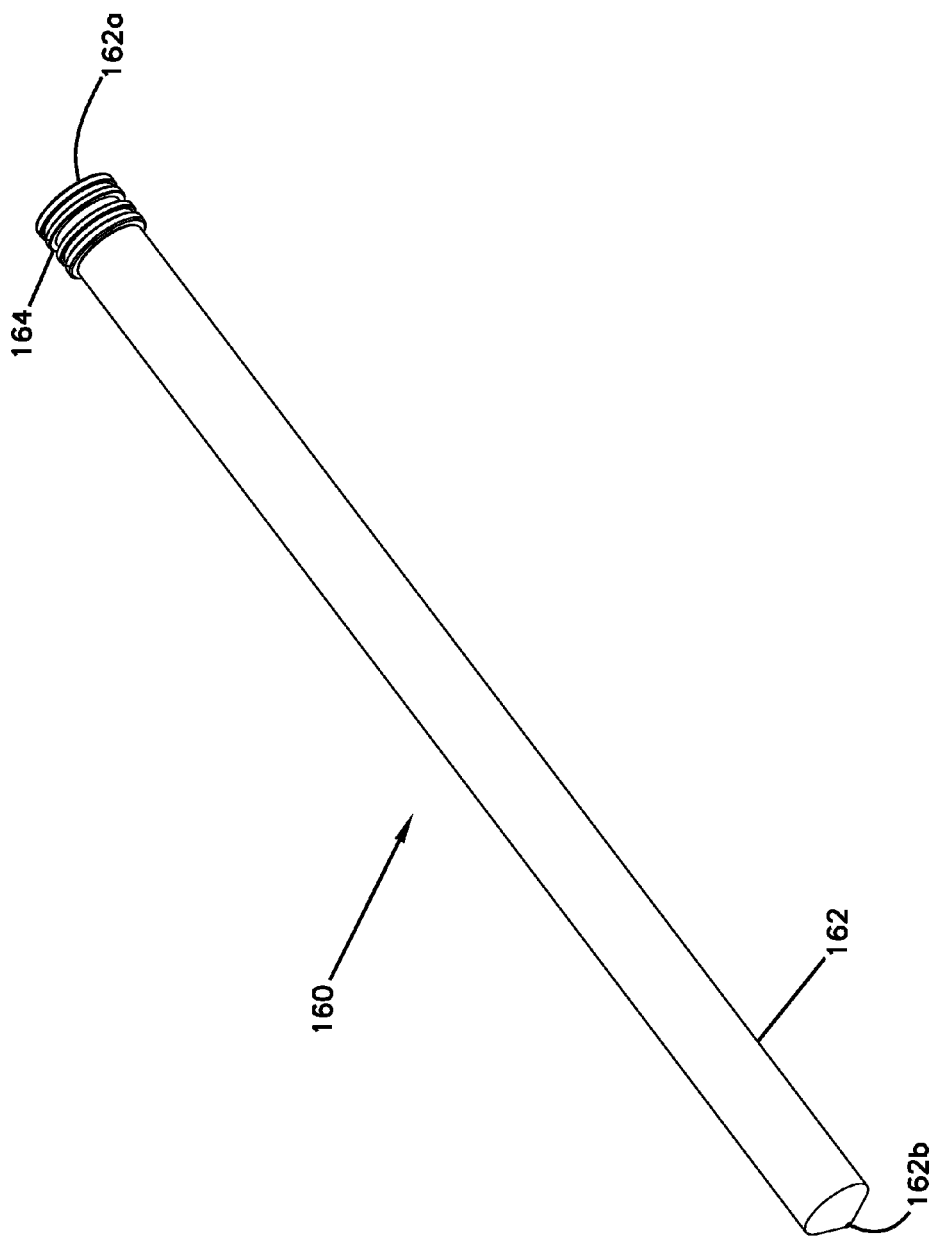
FIG. 14 is a perspective view of a cylinder rod shown as part of the rescue strut at FIG. 1.
Figure 17:
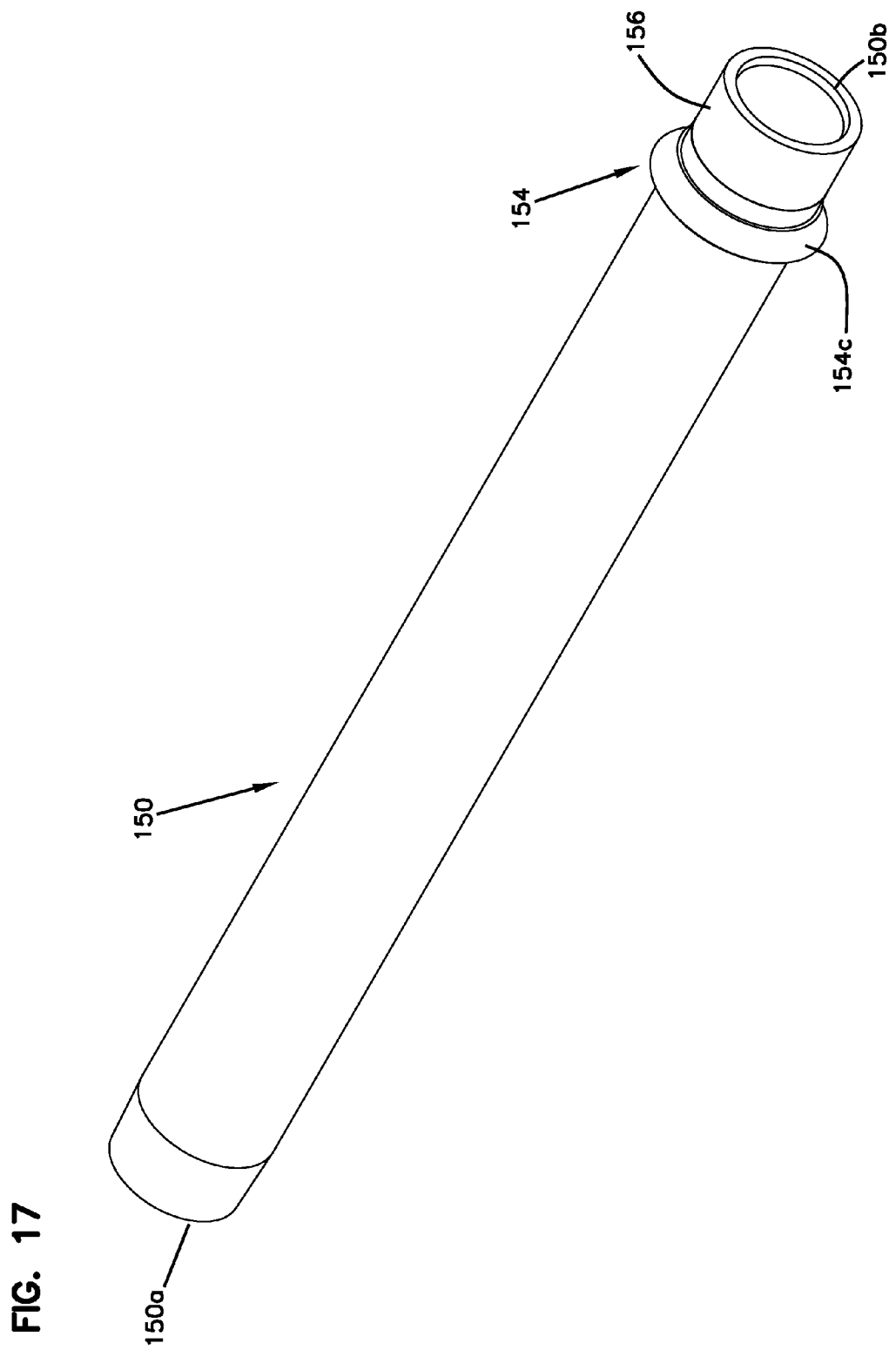
FIG. 17 is perspective view of a cylinder tube shown as part of the rescue strut shown in FIG. 1.
Figure 20:
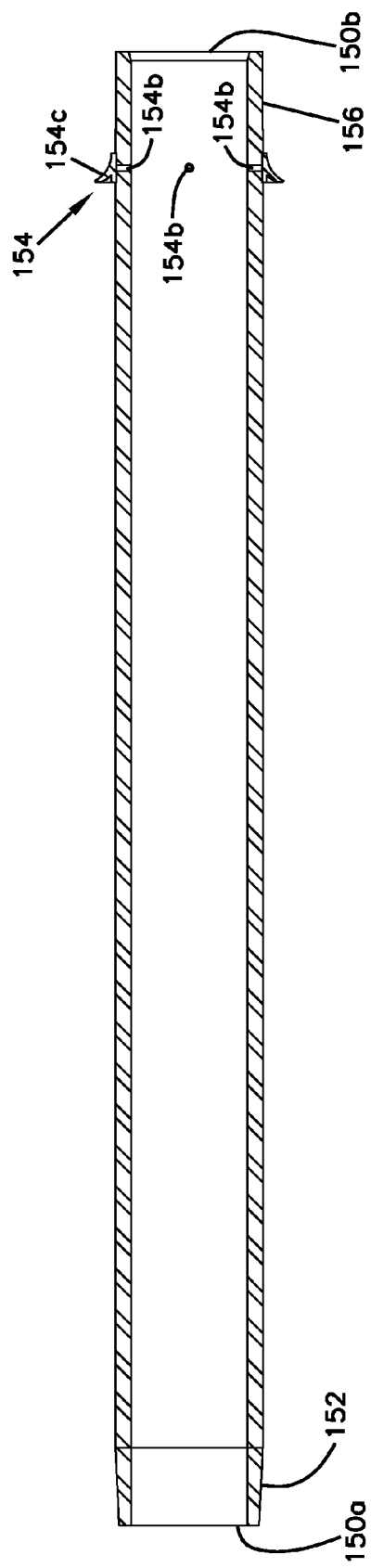
FIG. 20 is a side cross-sectional view of the cylinder tube shown in FIG. 19, with a shaft ring seal installed.

Referring to FIGS. 14 to 16, the cylinder rod assembly 160 is shown in greater detail. As shown, the cylinder rod assembly 160 has a cylinder rod 162 and a piston 164. The cylinder rod 162 has a first end 162a, a second end 162b, and a surface 162c. The first end 162a is configured to engage with the piston 162 while the second end 162b, shown as being tapered, is configured for engagement with an attachment tool 500 or a push block 210 of the extension tube assembly 210. As can be seen at FIG. 16, the first end 162a of the cylinder rod 162 has a reduced diameter such that it can be internally received by the piston 162. The piston 162 has a face 164a, against which hydraulic fluid exerts a force during pumping, and a pair of seal supports 164b. The seal supports 164b retain seal members 164c, which may be O-ring type seals. The seal members 164c ensure a fluid tight seal between the piston 162 and the internal wall of the cylinder tube 150 such that hydraulic fluid entering the cylinder tube 150 exerts a pressure force against the face of the piston 162 without leaking past the piston 162. As fluid enters the cylinder tube 150, the piston 164 slides along the cylinder tube 150 until the pumping action of the pump actuator 102 is stopped, or until the piston 162 reaches beyond the bypass feature 154 of the cylinder tube 150. Accordingly, the cylinder rod 162 extends through the end cap 170 as the piston 162 extends towards the end cap to extend the extension tube assembly 200. As shown, the cylinder rod 162 is chrome plated steel and welded to the piston 164. Other materials and attachment means may be used.

As described above, the completed pump assembly 100 can be easily configured in the field to be utilized as a stand-alone device, or in conjunction with the extension tube assembly 200. As shown, the pump assembly 100 is configured to have an extension travel length a maximum length L1 of about 48 inches and a minimum length L2 of about 32 inches resulting in an effective travel length of about 16 inches, as defined by the difference between length L2 and length L1. However, it is to be understood that the pump assembly 100 could be configured to have different minimum, maximum, and travel lengths, by modifying the lengths of the oil reservoir tube 140, the cylinder tube 150, and the cylinder rod 160.

Extension Tube Assembly

Referring back to FIGS. 1-4, the extension tube assembly 200 is shown in greater detail. The extension tube assembly 200 is configured to extend and retract through operation of the hydraulic pump assembly 100. As shown, the extension tube assembly 200 includes an outer support tube 202, an inner support tube 204 disposed within the outer support tube 202, and an extension tube 206 disposed within the inner support tube 204. In the embodiment shown, the tubes 202, 204, 206 are formed from aluminum tubing. However, other materials may be used.

In the embodiment shown, the outer support tube has a first end 202a, a second end 202b, and defines an interior volume 202c. As discussed previously, the first end 202a of the outer support is connected to the hydraulic manifold block 122 by a connector 226 and mounting hole 202e. The second end 202b of the outer support tube 202 is provided with a recess 202d for receiving and retaining a guide bushing 214. In the embodiment shown, the guide bushing 214 is formed from a plastic material and secured to the outer support tube 202 by an adhesive, such as an epoxy. However, other materials and methods of attachment may be used. The guide bushing 214, allows for the inner support tube 204 to easily slide into and out of the second end 202b of the outer support tube 202 by providing a low friction interface against the inner support tube 204. As shown, the guide bushing 214 is provided with a lip 214c to additionally secure the bushing 214 to the outer support tube 202 and to prevent the bushing 214 from being inserted too far into the interior volume 202c.

As shown, the inner support tube 204, is provided with a first end 204a, a second end 204b, and defines an interior volume 204c while the extension tube 206 is also provided with a first end 206a, a second end 206b, and an interior volume 206c. As shown, the extension tube 206 is at least partially received within the interior volume 204c of the inner support tube 204.

At the second end 204b of the inner support tube 204, securing holes 204d may be provided to mechanically fix the extension tube 206 to the inner support tube 204 with a pin 226. In one embodiment, pin 226 is a quick release pin. The extension tube 206 is also provided with a plurality of radially and axially spaced adjustment holes 206d such that the starting and ending length of the rescue strut 10 can be modified for any particular application. Because the pump assembly 100 has a fixed travel length (length L2 minus length L1), it may be desirable to extend the extension tube 206 with respect to the inner support tube 204 in applications where the starting height or length is relatively high. In the opposite circumstance where the rescue strut starting length needs to be relatively short, it would be more desirable to fix the extension tube 206 to the inner support tube 204 nearer to the second end 206b. It is also noted that the rescue strut 10 can be used without the extension tube 206 provided that the inner support tube 204 is sufficiently long with respect to the outer support tube 202.

As configured, the rescue strut 10 is configured to have a maximum length L3 of about 105 inches and a minimum length L4 of about 72 inches, depending upon the travel length of the pump assembly (length L2 minus length L1) and the relative mounting position of the extension tube 206 to the inner support tube 204. Lengths L3 and L4 are also dependent upon the heights of the end plate assembly 300 and the end tool 400. However, it is to be understood that the rescue strut 10 could be configured to have different minimum and maximum lengths, by modifying the lengths of the inner support tube 204 and extension tube 206, the heights of the end plate assembly 300 and the end tool 400, and as stated before, the lengths of the oil reservoir tube 140, the cylinder tube 150, and the cylinder rod 160.

Figure 21:
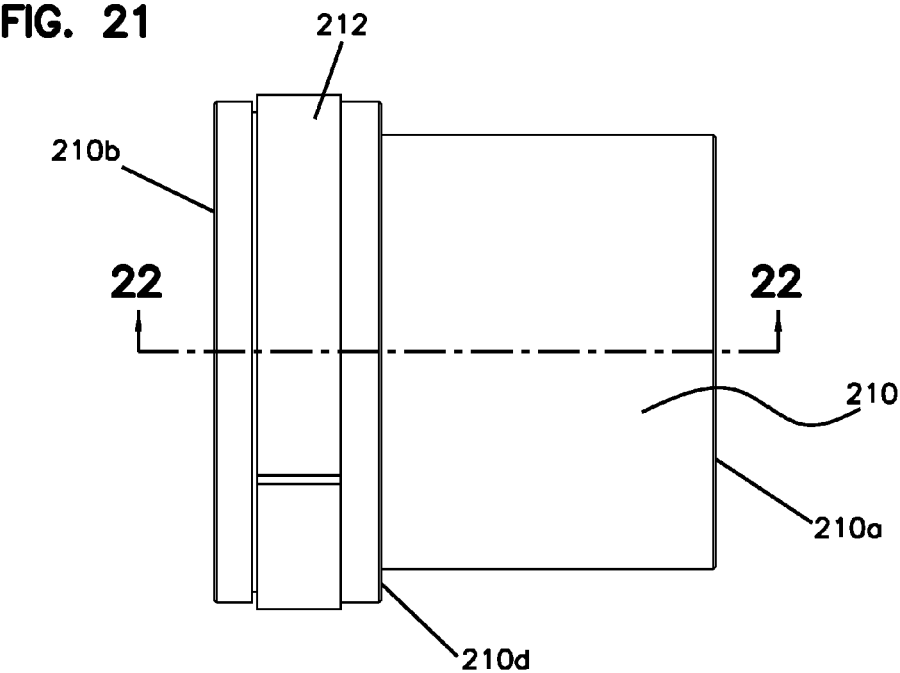
FIG. 21 is a side view of a push block shown as part of the rescue strut shown in FIG. 1.
Figure 22:
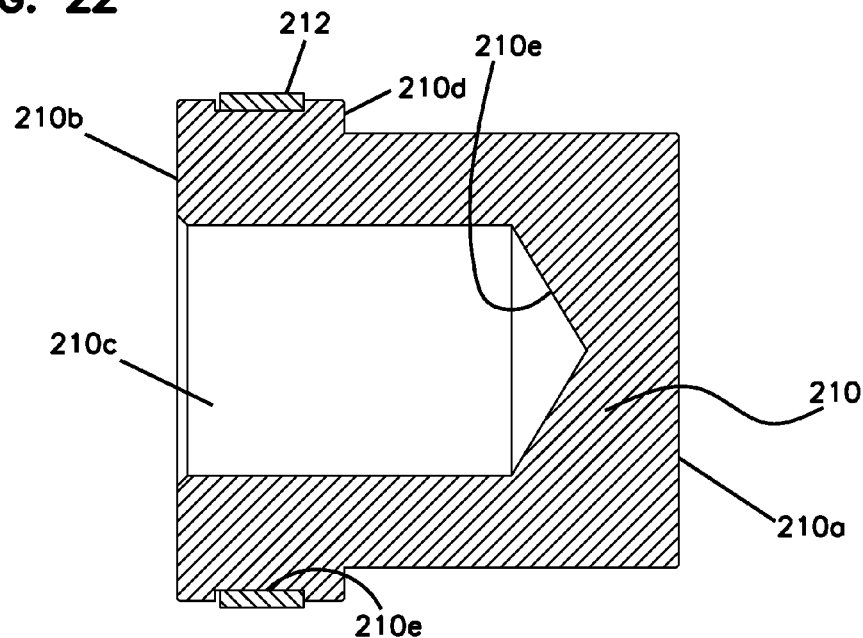
FIG. 22 is a cross-sectional view of the push block shown in FIG. 19, taken along line 20-20 as indicated at FIG. 21.
Figure 23:
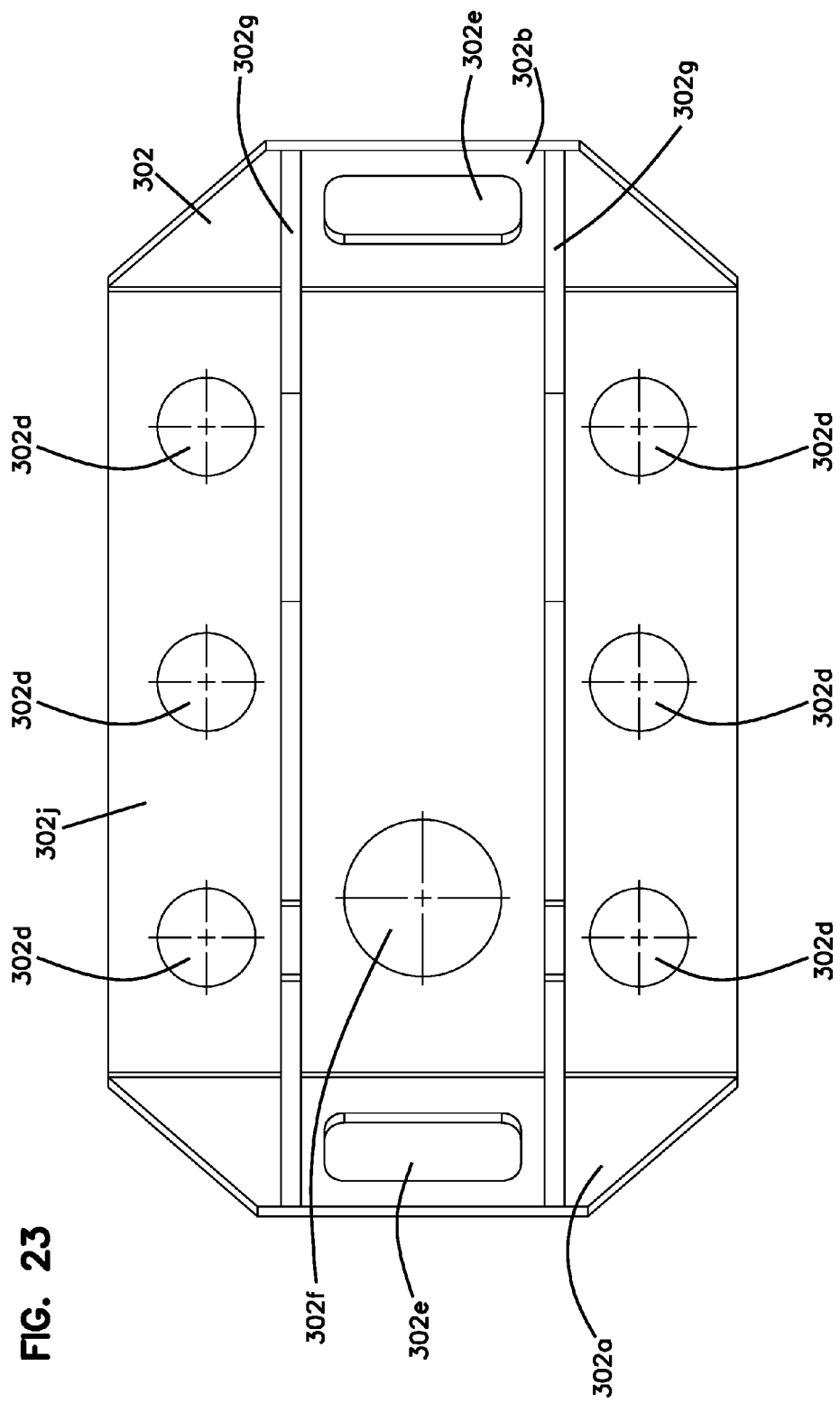
FIG. 23 is a top view of a pivot plate shown as part of the rescue strut shown in FIG. 1.
Figure 24:
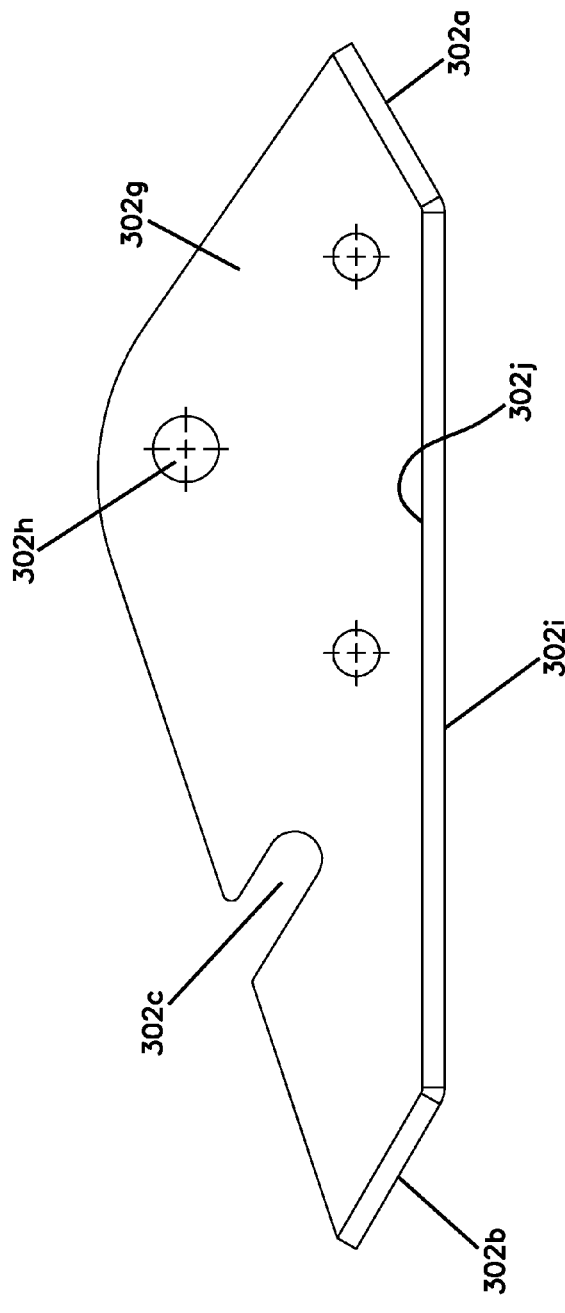
FIG. 24 is a side view of the pivot plate shown in FIG. 23.

In the embodiment shown, the first end 204a of the inner support tube 204 is configured to receive a push block 210. As can be seen most easily at FIGS. 21 and 22, the push block 210 has a first end 210a that is received into the interior volume 204c of the inner support tube 204. The push block 210 is also provided with a shoulder 210c to engage with the first end of 204a of the inner support tube 204. As shown, the push block 210 is machined from aluminum and secured to the inner support tube 204 with an adhesive, such as an epoxy. However, other materials and attachment means may be used. At a second end 210b of the push block 210, a recess 210c is provided. Recess 210c is configured to receive the second end 162b of the cylinder rod 162. As shown, recess 210c has an internal diameter and a tapered bottom surface 210e that general match that of the cylinder rod second end 162b. Accordingly, as the pump assembly 100 extends the cylinder rod 162, the cylinder rod 162 exerts an extending force on the push block 210, which in turn acts to extend the inner support tube 204.

As shown, the push block 210 is also provided with a recess 210e configure to receive and retain a wear ring 212 located on tab 210d. In the embodiment shown, the wear ring 212 is formed from a plastic material. However, other materials may be used. The wear ring 212 allows for the inner support tube 204 to easily slide within the outer support tube 202 by providing a low friction interface against the inner support tube 204.

The extension tube assembly 200 is also shown as being configured with a handle tube 220 that is attached to the outer support tube 202 by plates 222. As shown, handle tube 220 is aluminum and secured to the plates 222 with set screws 228 while plates 222 are aluminum and secured to the outer support tube 202 by welds. However, other materials and attachment means may be utilized. The handle tube 220 provides a handle for carrying the rescue strut 10. It is noted that a wide clearance is provided between the handle tube 200 and the outer support tube 202 to allow for a user wearing gloves to easily grasp and carry the rescue strut 10. As shown, a clearance of about 1¼ inch is provided. The handle tube 220 may also be provided with end caps 220a, 220b. In one embodiment, a welded end cap 220b is provided and the pump assembly handle 108 can be easily stored inside the handle tube 220 when the handle 108 is not in use. In the embodiment shown, the length of the handle tube 220 is less than the length of the handle 108 allowing for easy access to the pump handle. The pump handle 108 may be retained in the tube 220 by means of a plastic retainer or push-in type expandable grommet disposed in the end of the handle tube 220. Such a configuration allows for a sufficient friction fit between the handle 108 and the retainer/grommet to hold the handle 108 securely within the tube 220.

Pivot Plate Assembly

As indicated previously, the rescue strut 10 also includes a pivot plate assembly 300. Pivot plate assembly 300 is for providing a footing or base for the rescue strut 10 such that the rescue strut 10 can be securely placed on the ground, or another surface. As shown, pivot plate assembly 300 has an end plate 302 having a first end 302a, a second end 302b, a bottom surface 302i and a top surface 302j. The end plate 302 is also provided with a pair of stiffening members 302g on the top surface 302j of the end plate 302 and extending between the first and second ends 302a, 302b. The stiffening members 302g increase the structural integrity of the end plate 302 and also provide a mounting location for the pump assembly 100. It is also noted that the end plate 302 slopes in an upward direction at each of the first end 302a and second end 302b. This feature allows the end plate 302 to be slid along the ground more easily, when such a motion is desired.

As shown, the end plate 302 and stiffening members 302g are provided with a number or apertures and/or recesses that sever various purposes. For example, stiffening members include apertures 302h for receiving a mounting pin 304 such that the hydraulic pump assembly 100 can be rotatably secured to the end plate assembly 300. The mounting pin 304 may be secured by a corresponding keeper or nut 306. It is noted that apertures 302h are offset from the center of the end plate 302 such that, when the pump assembly 100 and extension tube assembly 200 are disposed at an angle, the resulting force exerted onto the end plate 302 is directed more towards the middle of the length of the plate 302. This configuration results in additional stability of the end plate 302 against the ground, and reduces the potential for the front end of the end plate 302 to rise from the ground during a lifting operation.

The stiffening members 302g are each also shown as including a slot 302c for receiving a cable, strap, rope, chain, or similar tether that can be used fix the position of the end plate assembly 300 by additionally securing the strap or chain to another hydraulic or adjustable rescue strut, to a fixed object such as a ground stake or tree trunk, or to the secured object such as a vehicle. The end plate 302 is also shown as having apertures 302d that can also be used to fix the position of the end plate 302 through the use of stakes driven through the apertures 302d. Apertures 302e and 302f in the end plate 302 can also be used to accept cables, straps, ropes, chains, or similar tethers.

End Tools

Figure 25:
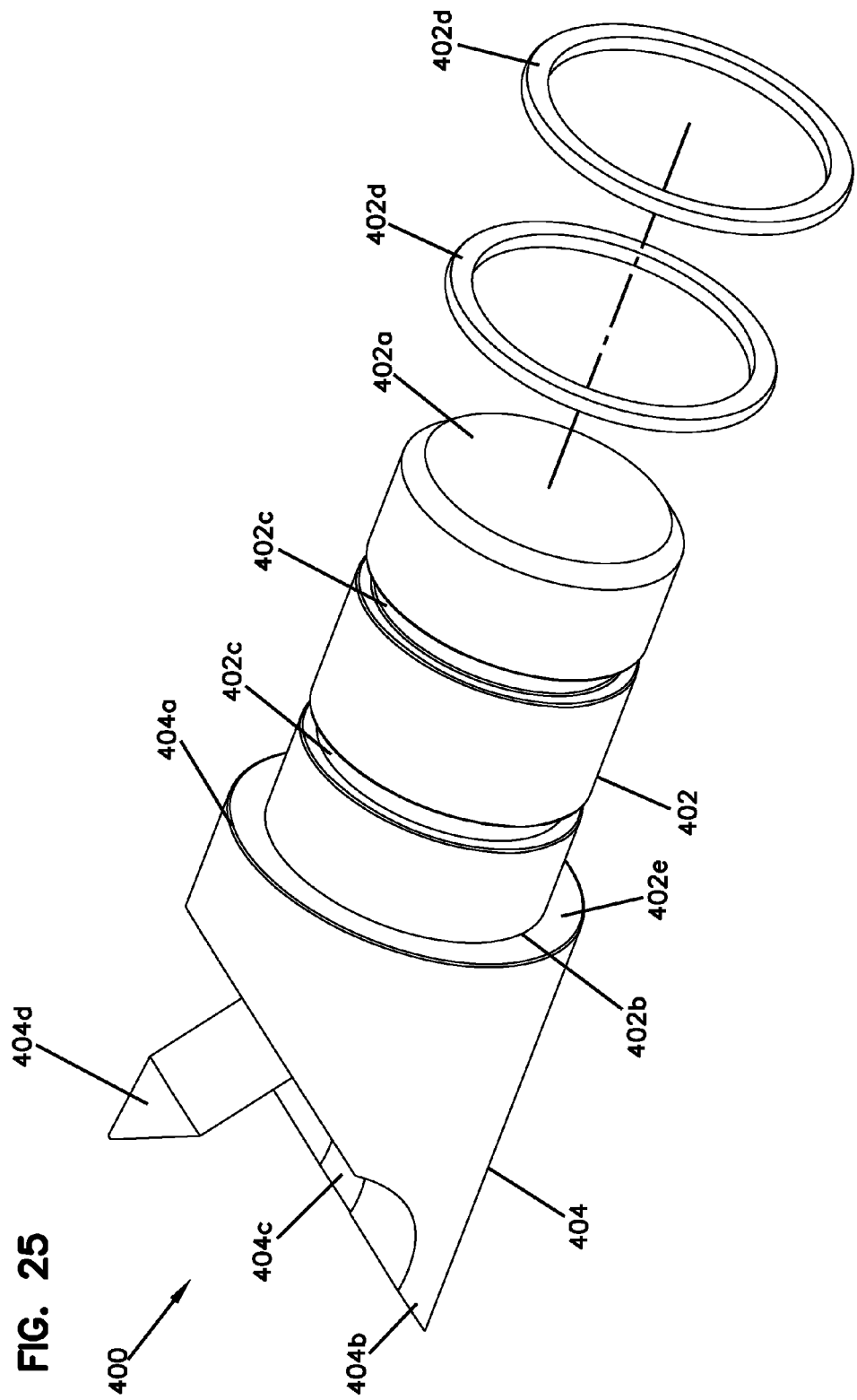
FIG. 25 is a perspective view of an end tool shown as part of the rescue strut shown in FIG. 1.

As indicated previously, the rescue strut 10 also includes a first end tool 400. The first end tool 400 is for engaging the object being supported, raised, and/or secured by the rescue strut 10. By way of non-limiting example, the object being supported can be a vehicle or a part of a building structure. As best seen at FIGS. 25 to 27, the first end tool 400 includes an insert portion 402 and a tool portion 404.

The insert portion 402 is for inserting and securing the first end tool 400 into the second end 206b of the extension tube 206. The insert portion 402 has a first end 402a and a second end 402b. The insert portion 402 is also shown as having recesses 402c between the first and second ends 402a, 402b configured to receive elastic members 402d. As shown, elastic members 402d are O-rings. The recesses 402c and elastic members 402d are configured to frictionally engage with the interior wall of the extension tube 206 such that the end tool 400, when inserted, will be retained in the extension tube 206. However, the configuration also allows for relatively easy removal of the first end tool 400 without requiring the use of tools or excessive force. The insert portion 402 is also provided with a shoulder 402e configure to engage with the second end 206b of the extension tube 206 such that the first end tool 400 can transmit the force exerted by the extension tube 206 to the object being supported by the end tool 400. It is also noted that, where the extension tube 206 is not used, the first end tool 400 may be configured to be installed directly onto the inner support tube 204 where the inner support tube 204 is configured to extend beyond the outer support tube 202.

As shown, the tool portion 404 of the first end tool 400 is provided with a first end 404a and a second end 404b, between which a variety of structures are provided to aid in engaging the object to be supported by the rescue strut 10. In one aspect, the tool portion 404 is tapered to form a sloped face 404e and a leading edge 404f at the first end 404a, and is also provided with a notch 404d. The sloped face 404e also has an opening 404c. The sloped face 404e also has a curved recess 404g. A sharpened steel pin 404d is also provided on tool portion 404 at the location of the sloped face 404e and is disposed at about a right angle to the sloped face 404e. Taken together, these features provide a structure that can be used to engage a wide variety of surfaces and structures when supporting an object with the first end tool 400.

Figure 28:
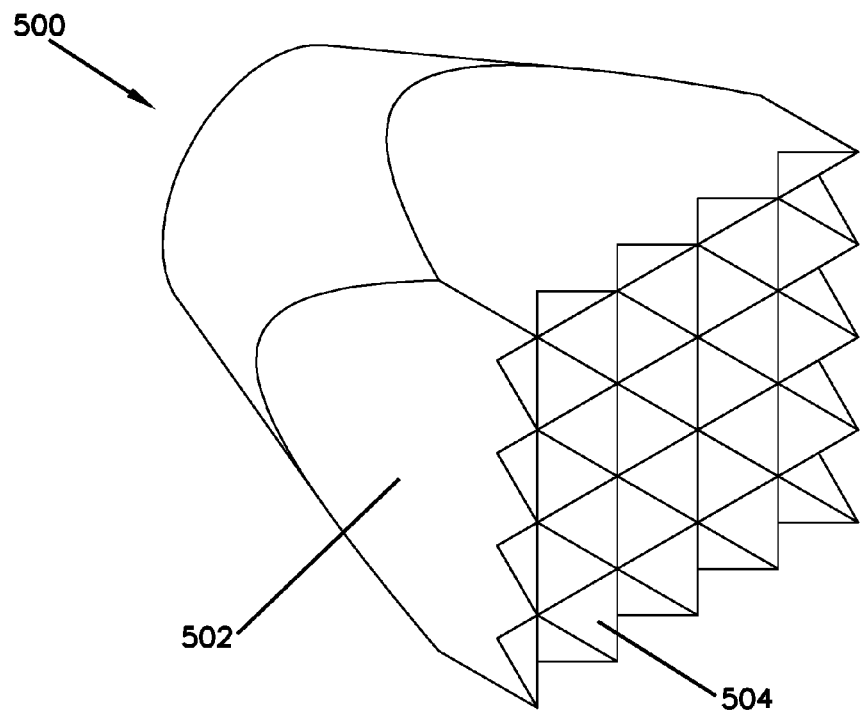
FIG. 28 is a perspective view of a cylinder rod attachment tool.
Figure 29:
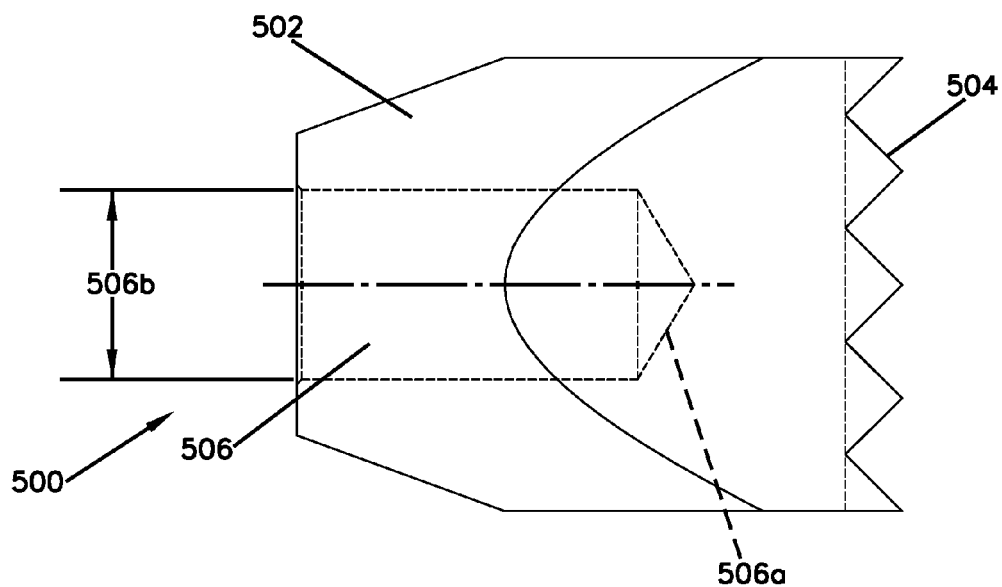
FIG. 29 is a side view of the cylinder rod attachment tool shown in FIG. 28.

Referring to FIGS. 28 and 29, a second end tool 500 is shown. The second end tool 500 is configured to be engaged with the cylinder rod 162 when the pump assembly 1000 is not connected to the extension tube assembly 200. As stated previously, the pump assembly 100 may be used by itself in certain applications, such as a dash-roll operation. To aid in such applications, second end tool 500 may be installed onto the second end 162b of the cylinder rod 162. As shown, second end tool 500 has a main body 502 with a tool end 504 and a recessed portion 506. The tool end 504 is provided with a textured surface to aid in engaging surfaces against which the second end tool 504 is applied. Similar to the configuration of the push block 210, the recessed portion 506 of the second end tool has an internal diameter that is about the same diameter as that of the cylinder rod 162, and is also provided with a tapered bottom portion 506a to match the tapered surface of the end of the cylinder rod 162.

It is noted that although the first end tool 400 is configured for attachment to the extension tube 206 and the second end tool 500 is configured for attachment to the cylinder rod 162, each of the tools 400, 500 could be configured for attachment to one or both of the tube 206 and rod 162. For example, the first end tool 400 could be provided with a recess similar to that provided for the second end tool 500 such that it could receive the second end 162b of the cylinder rod 162.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the disclosure.

What is claimed is:

1. A manual rescue tool comprising:
   (a) a hydraulic pump assembly comprising:
      i. a manual hydraulic pump;
      ii. a hydraulic manifold block in fluid communication with the hydraulic pump;
      iii. a cylinder tube mounted to the hydraulic manifold block, the cylinder tube defining an interior volume that is in fluid communication with an outlet side of the manual hydraulic pump;
      iv. an oil reservoir tube mounted to the hydraulic manifold block, the oil reservoir tube and the cylinder tube defining an oil reservoir in fluid communication with an inlet side of the manual hydraulic pump;
      v. a cylinder rod having a first end and a second end, the first end having a piston slidable within the cylinder tube;
      vi. wherein the cylinder tube has a bypass feature configured to allow hydraulic fluid to flow from the interior volume of the cylinder tube into the oil reservoir when the piston is moved within the cylinder tube beyond the bypass feature;
      vii. wherein the bypass feature further comprises a ring seal configured to block fluid from flowing from the oil reservoir into the cylinder tube; and
   (b) an extension tube assembly comprising:
      i. an outer support tube mounted to the pump assembly hydraulic manifold block;
      ii. an inner support tube slidably received within the outer support tube, the inner support tube being operably connected to the second end of the cylinder rod;
      iii. a push block mounted to the inner support tube, the push block being in direct connection with the second end of the cylinder rod; and
   (c) a first end tool operably connected to the inner support tube of the extension tube assembly.

2. The manual rescue tool of claim 1, wherein the extension tube assembly further comprises an extension tube connected to the inner support tube and the first end tool, the extension tube being slidable within the inner support tube.

3. The manual rescue tool of claim 2, wherein the extension tube is adjustably connected to the inner support tube by a mounting pin.

4. The manual rescue tool of claim 3, wherein the extension tube is provided with a plurality of openings configured to align with at least one opening on the inner support tube and wherein the relative position between the extension tube and the inner support tube is fixed by the mounting pin.

5. The manual rescue tool of claim 1, wherein the outer support tube is removably connected to the pump assembly hydraulic manifold block.

6. The manual rescue tool of claim 5, wherein the outer support tube is connected to the manifold block by a connection pin.

7. The manual rescue tool of claim 5, further comprising a second end tool configured to be attached to the second end of the cylinder rod when the extension tube assembly and first end tool are separated from the hydraulic pump assembly.

8. The manual rescue tool of claim 1, further comprising an end plate assembly rotatably mounted to the pump assembly hydraulic manifold block.

9. The manual rescue tool of claim 8, wherein the end plate assembly is connected to the pump assembly hydraulic manifold block by a removable pin.

10. The manual rescue tool of claim 1, wherein the push block includes a wear ring configured for slidable engagement with the outer support tube.

11. The manual rescue tool of claim 1, wherein the cylinder tube has threads at opposite ends, an end cap is secured to the cylinder tube at a first end and the manifold block is secured at a second end and the oil reservoir tube is located between the end cap and the manifold block.

12. The manual rescue tool of claim 11, wherein the end cap additionally defines the oil reservoir.

13. The manual rescue tool of claim 12, wherein the end cap has a shaft wiper member.

14. The manual rescue tool of claim 1, further comprising a first handle mounted to the outer support tube.

15. The manual rescue tool of claim 14, wherein the first handle is a hollow tube.

16. The manual rescue tool of claim 15, wherein the handle is configured to store a second handle, the second handle being configured to operate the manual hydraulic pump.

17. The manual rescue tool of claim 1, wherein the hydraulic pump assembly and rescue tool are operable in both a horizontal position and a vertical position.

18. The manual rescue tool of claim 1, further comprising a pivot plate assembly mounted to the hydraulic pump assembly, the pivot plate assembly providing a plurality of apertures configured to mount the pivot plate to a surface, and a plurality of tapered sections.

19. A manual rescue tool comprising:
   (a) a hydraulic pump assembly having;
      i. a hydraulic manifold block;
      ii. a manual hydraulic pump in fluid communication with the hydraulic manifold block;
      iii. a cylinder tube mounted to the hydraulic manifold block, the cylinder tube defining an interior volume that is in fluid communication with an outlet side of the manual hydraulic pump;
      iv. an oil reservoir tube mounted to the hydraulic manifold block, the oil reservoir tube and the cylinder tube defining an oil reservoir in fluid communication with an inlet side of the manual hydraulic pump; and
      v. a cylinder rod having a first end and a second end, the first end having a piston slidable within the cylinder tube; and
      vi. wherein the cylinder tube has a bypass feature configured to allow hydraulic fluid to flow from the interior volume of the cylinder tube into the oil reservoir when the piston is moved within the cylinder tube beyond the bypass feature;
      vii. wherein the bypass feature further comprises a ring seal configured to block fluid from flowing from the oil reservoir into the cylinder tube; and
   (b) an extension tube assembly extendable by the hydraulic pump assembly, the extension tube assembly being mounted to and supported by the manifold block; and
   (c) a first end tool operably connected to a first end of the extension tube assembly; and
   (d) a pivot plate assembly rotatably mounted to the manifold block of the hydraulic pump assembly, the pivot plate assembly having a plurality of apertures configured to mount the pivot plate to a surface, and a plurality of tapered sections for mobility on the surface.

20. The manual rescue tool of claim 19, wherein the extension tube assembly comprises:
   (a) an outer support tube mounted to the pump assembly hydraulic manifold block;
   (b) an inner support tube slidably received within the outer support tube, the inner support tube being operably connected to the second end of the cylinder rod; and (c) an extension tube connected to the inner support tube and the first end tool, the extension tube being slidable within the inner support tube.

21. The manual rescue tool of claim 20, wherein the extension tube is adjustably connected to the inner support tube by a mounting pin.

22. The manual rescue tool of claim 21, wherein the extension tube is provided with a plurality of openings configured to align with at least one opening on the inner support tube and wherein the relative position between the extension tube and the inner support tube is fixed by the mounting pin.

23. The manual rescue tool of claim 20, wherein the outer support tube is removably connected to the pump assembly hydraulic manifold block.

24. The manual rescue tool of claim 23, wherein the outer support tube is connected to the manifold block by a connection pin.

25. The manual rescue tool of claim 20, further comprising a push block mounted to the inner support tube, the push block being in direct connection with the second end of the cylinder rod.

26. The manual rescue tool of claim 25, wherein the push block includes a wear ring configured for slidable engagement with the outer support tube.

27. The manual rescue tool of claim 20, further comprising a first handle mounted to the outer support tube.

28. The manual rescue tool of claim 27, wherein the first handle is a hollow tube.

29. The manual rescue tool of claim 28, wherein the handle is configured to store a second handle, the second handle being configured to operate the manual hydraulic pump.

30. The manual rescue tool of claim 20, further comprising a second end tool configured to be attached to the second end of the cylinder rod when the extension tube assembly and first end tool are separated from the hydraulic pump assembly.

31. The manual rescue tool of claim 19, wherein the pivot plate assembly is connected to the pump assembly hydraulic manifold block by a removable pin.

32. The manual rescue tool of claim 19, wherein the hydraulic pump assembly and rescue tool are operable in both a horizontal position and a vertical position.

33. A manual rescue tool comprising:
(a) a hydraulic pump assembly having;
   i. a hydraulic manifold block;
   ii. a manual hydraulic pump in fluid communication with the hydraulic manifold block;
   iii. a cylinder tube mounted to the hydraulic manifold block, the cylinder tube defining an interior volume that is in fluid communication with an outlet side of the manual hydraulic pump;
   iv. an oil reservoir tube mounted to the hydraulic manifold block, the oil reservoir tube and the cylinder tube defining an oil reservoir in fluid communication with an inlet side of the manual hydraulic pump;
   v. a cylinder rod having a first end and a second end, the first end having a piston slidable within the cylinder tube;
   vi. wherein the cylinder tube has a bypass feature configured to allow hydraulic fluid to flow from the interior volume of the cylinder tube into the oil reservoir when the piston is moved within the cylinder tube beyond the bypass feature;
   vii. wherein the bypass feature further comprises a ring seal configured to block fluid from flowing from the oil reservoir into the cylinder tube; and
(b) an extension tube assembly extendable by the hydraulic pump assembly, the extension tube assembly being mounted to and supported by the manifold block; and
(c) a first end tool operably connected to a first end of the extension tube assembly; and
(d) a pivot plate assembly rotatably mounted to the manifold block of the hydraulic pump assembly, the pivot plate assembly having a plurality of apertures configured to mount the pivot plate to a surface, and a plurality of tapered sections for mobility on the surface; and
(e) wherein the cylinder tube has threads at opposite ends, an end cap is secured to the cylinder tube at a first end and the manifold block is secured at a second end and the oil reservoir tube is located between the end cap and the manifold block.

34. The manual rescue tool of claim 33, wherein the end cap additionally defines the oil reservoir.

35. The manual rescue tool of claim 33, wherein the end cap has a shaft wiper member.

* * * * *